(12) United States Patent
Li et al.

(10) Patent No.: US 7,394,936 B2
(45) Date of Patent: Jul. 1, 2008

(54) SYSTEM AND METHOD FOR CURVE RECOGNITION IN A HAND-DRAWN CHART IN INK INPUT

(75) Inventors: Yantao Li, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 11/088,619

(22) Filed: Mar. 23, 2005

(65) Prior Publication Data

US 2006/0062464 A1 Mar. 23, 2006

Related U.S. Application Data

(60) Provisional application No. 60/612,200, filed on Sep. 22, 2004.

(51) Int. Cl.
G06K 9/18 (2006.01)

(52) U.S. Cl. .......................... 382/186; 382/187
(58) Field of Classification Search ................. 382/181, 382/185–189, 203, 209, 218, 224, 225, 316
See application file for complete search history.

(56) References Cited

U.S. PATENT DOCUMENTS

| | | | |
|---|---|---|---|
| 4,949,388 A | 8/1990 | Bhaskaran | |
| 5,467,411 A * | 11/1995 | Tanaka et al. | 382/113 |
| 5,544,265 A | 8/1996 | Bozinovic | |
| 5,563,991 A | 10/1996 | Mahoney | |
| 5,633,955 A * | 5/1997 | Bozinovic et al. | 382/187 |
| 6,411,732 B1 | 6/2002 | Saund | |
| 6,438,523 B1 | 8/2002 | Oberteuffer | |
| 6,525,749 B1 | 2/2003 | Moran | |
| 7,136,082 B2 | 11/2006 | Saund | |
| 7,139,004 B2 | 11/2006 | Saund | |
| 2002/0141643 A1 | 10/2002 | Jaeger | |
| 2004/0090439 A1 | 5/2004 | Dillner | |

OTHER PUBLICATIONS

Office Action mailed Sep. 20, 2007 cited in related U.S. Appl. No. 11/089,288.
Office Action mailed Sep. 20, 2007 cited in related U.S. Appl. No. 11/088,609.

* cited by examiner

*Primary Examiner*—Daniel G Mariam
(74) *Attorney, Agent, or Firm*—Workman Nydegger

(57) ABSTRACT

A system and method for recognition of hand-drawn charts in ink input is provided. A chart recognizer may be provided that may recognize a hand-drawn diagram or chart in ink input. The chart recognizer may include a connectivity-based recognizer for recognizing a hand-drawn chart having connected areas such as a pie chart, a connected container recognizer for recognizing a hand-drawn chart having connected containers such as a cycle diagram, and a curve recognizer for recognizing a hand-drawn chart having a curve. The connected container recognizer may also recognize a hand-drawn chart having intersecting containers such as a Venn diagram or a hand-drawn chart having a container that may include another container such as a target diagram.

19 Claims, 28 Drawing Sheets

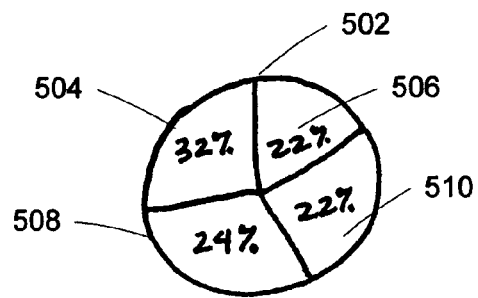
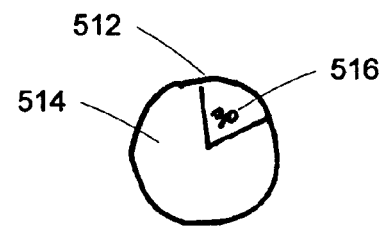
FIG. 5A  FIG. 5B
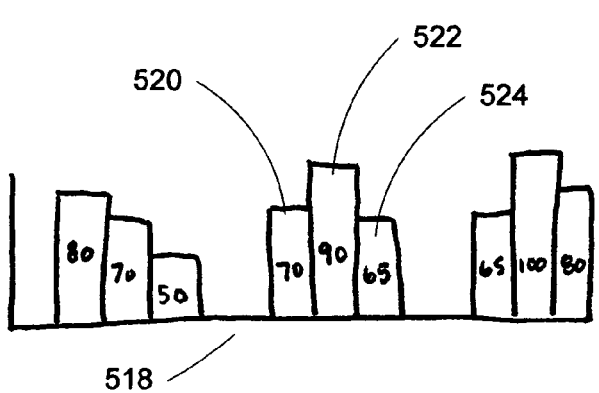
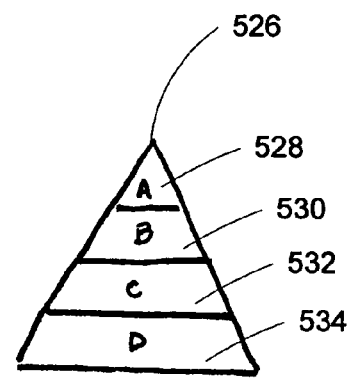
FIG. 5C  FIG. 5D

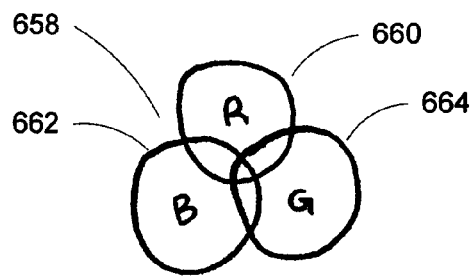
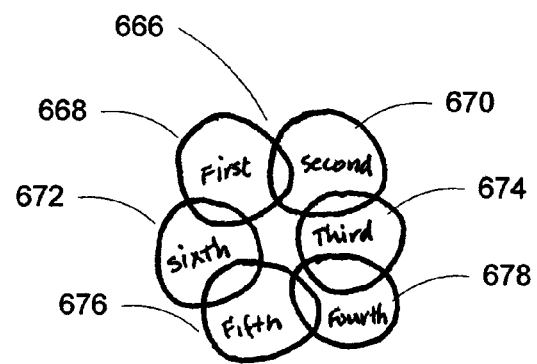
*FIG. 6E*   *FIG. 6F*
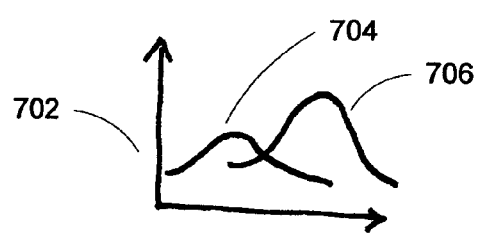
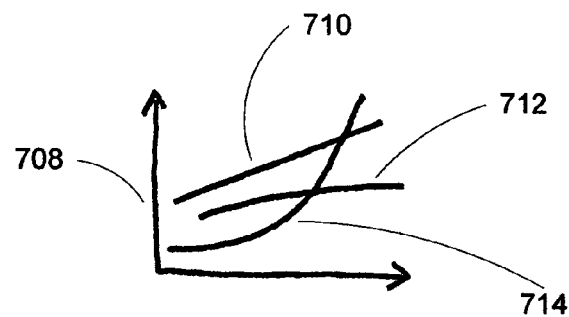
*FIG. 7A*   *FIG. 7B*

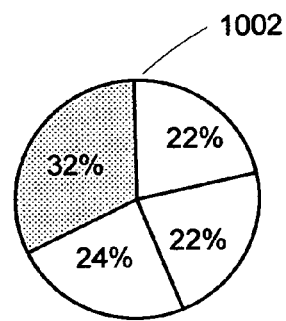
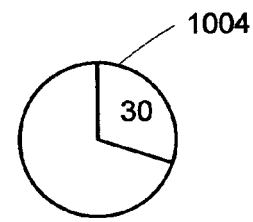
FIG. 10A    FIG. 10B
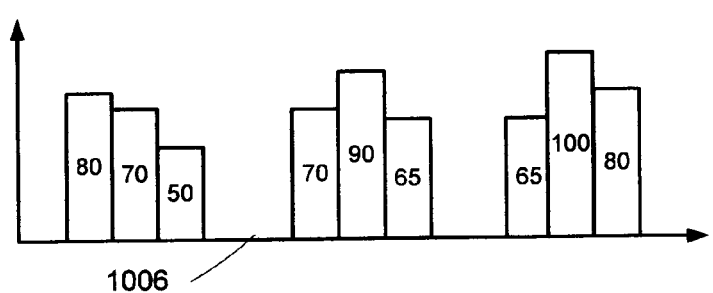
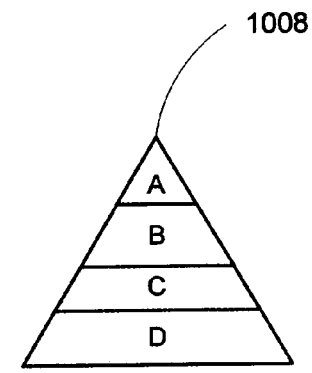
FIG. 10C    FIG. 10D

SYSTEM AND METHOD FOR CURVE RECOGNITION IN A HAND-DRAWN CHART IN INK INPUT

CROSS-REFERENCE TO RELATED APPLICATIONS

The present invention claims priority to U.S. provisional patent application Ser. No. 60/612,200 filed Sep. 21, 2004 and incorporated herein in its entirety.

The present invention is related to the following United States patent applications, filed concurrently herewith and incorporated herein in their entireties:

U.S. patent application Ser. No. 11/088,618 "System And Method For Recognition of a Hand-Drawn Chart In Ink Input,"

U.S. patent application Ser. No. 11/089,288 "System And Method For Connectivity-Based Recognition of a Hand-Drawn Chart In Ink Input," and U.S. patent application Ser. No. 11/088,609 "System And Method For Connected Container Recognition of a Hand-Drawn Chart In Ink Input,"

FIELD OF THE INVENTION

The invention relates generally to computer systems, and more particularly to an improved system and method for recognition of a hand-drawn chart in ink input.

BACKGROUND OF THE INVENTION

The ability to recognize various types of hand-drawn diagrams and charts is important for users to be able to draw directly on their computers using ink input or ink notes. Current hardware and software may be able to capture ink representing handwriting reasonably well but is currently unable to similarly recognize and represent the meaning of hand-drawn charts in ink input. As a result, users instead use menu-based application programs to create drawings of diagrams and charts. Various diagrams and charts may be presented by such application programs for a user to select and copy onto a drawing grid or into a document for editing. For example, a drawing application may include a menu option for inserting a diagram or organization chart in a document for editing.

Research focused on recognition of hand-drawn objects has yielded marginal results to date. For instance, incremental recognition algorithms have been used that may recognize simple geometric shapes such as a circle or a box from a specific number of strokes made in a particular order. However, such incremental algorithms rely on stroke order and/or assume a particular number of strokes in order to recognize a particular hand-drawn object. Such an approach fails to be robust for several reasons. For one, none of the incremental algorithms solves the grouping problem of deciding which collection of strokes belongs together because those strokes represent a specific shape or hand-drawn object such as a chart. Without the ability to group strokes together that belong to a shape or hand-drawn object, incremental algorithms may not accommodate multi-stroke shapes or hand-drawn objects such as a diagram or chart.

What is needed is a way for recognizing and representing the meaning of hand-drawn objects that is insensitive to stroke input order and/or the number of strokes required to form any given diagram or chart. Any such system and method should be able to detect multi-stroke hand-drawn charts and be able to decide which collection of strokes belong together that represent different diagrams or charts.

SUMMARY OF THE INVENTION

Briefly, the present invention provides a system and method for recognition of a hand-drawn chart in ink input. To this end, a chart recognizer may be provided that may recognize a hand-drawn diagram or chart in ink input. The chart recognizer may include a connectivity-based recognizer for recognizing a hand-drawn chart having connected areas such as a pie chart, a bar chart, a pyramid diagram, and so forth. The chart recognizer may also include a connected container recognizer for recognizing a hand-drawn chart having connected containers such as a cycle diagram, a radial diagram, an organizational chart and so forth. The connected container recognizer may also recognize a hand-drawn chart having intersecting containers such as a Venn diagram or a hand-drawn chart having a container that may include another container such as a target diagram. Additionally, the chart recognizer may include a curve recognizer for recognizing a hand-drawn chart having a curve such as a line segment, a normal distribution curve, an exponential curve, a logarithmic curve and so forth.

In one embodiment, container and connector detection may be performed for ink input received. Then shape recognition may be performed for each container and each connector detected within the ink input. Next, chart recognition may then be performed for containers and connectors recognized within the ink input. A drawing may then be generated for each hand-drawn chart recognized within the ink input. To generate a drawing from a recognized hand-drawn chart, content detection and shape refinement may be performed.

In general, any type of hand-drawn diagram or chart may be recognized by performing chart recognition. Once containers and connectors may be recognized within the ink input, connectivity-based recognition may be performed for recognizing a hand-drawn chart having connected areas such as a pie chart, connected container recognition may be performed for recognizing a hand-drawn chart having connected containers such a cycle diagram, and curve recognition may be performed for recognizing a hand-drawn chart having a curve or line. Moreover, connected container recognition may recognize hand-drawn diagrams or charts that may include intersecting containers such as a Venn diagram and may also recognize hand-drawn diagrams or charts with a container that may entirely include another container such as a target diagram.

Advantageously, the system and method are insensitive to stroke input order and the number of strokes that may form a hand-drawn chart. Furthermore, the system and method may be used to detect any type of chart by providing an appropriate type of chart recognizer. Once the type of diagram or chart may be recognized, the shape of the chart may be refined and drawn.

Other advantages will become apparent from the following detailed description when taken in conjunction with the drawings, in which:

BRIEF DESCRIPTION OF THE DRAWINGS

FIGS. 5A-5D are exemplary illustrations generally representing types of diagrams or charts that may be recognized by connectivity-based recognition, in accordance with an aspect of the present invention;

FIGS. 6A-6F are exemplary illustrations generally representing types of diagrams or charts that may be recognized by connected container recognition, in accordance with an aspect of the present invention;

FIGS. 7A-7B are exemplary illustrations generally representing types of diagrams or charts that may be recognized by curve recognition, in accordance with an aspect of the present invention;

FIGS. 10A-10D are exemplary illustrations generally representing types of diagrams or charts recognized by connectivity-based recognition for which shape refinement has been performed, in accordance with an aspect of the present invention;

DETAILED DESCRIPTION

Exemplary Operating Environment

Figure 1:
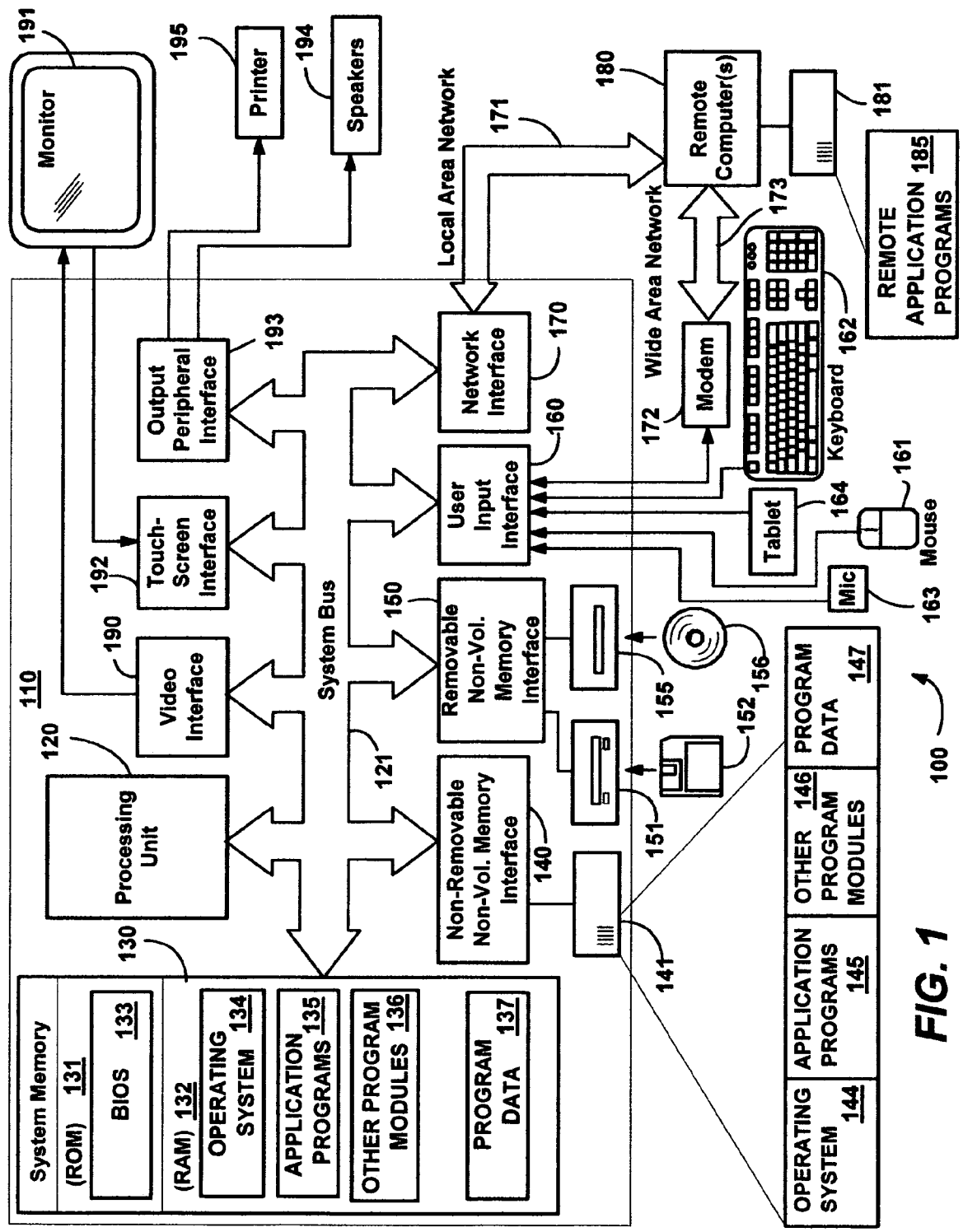
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Recognition of a Hand-Drawn Chart

The present invention is generally directed towards a system and method for recognition of a hand-drawn diagram or chart in ink input. As used herein, a hand-drawn object or drawing object may mean any handwritten non-character shape or drawing. A hand-drawn chart may mean any handwritten diagram or chart, including without limitation a pie chart, a bar chart, a cycle diagram, a Venn diagram, and so forth. A user may draw diagrams and charts freely without restrictions on the hand-drawn input. A hand-drawn chart may have many strokes and the input order of strokes may be arbitrary so that the system and method may accept any ink as input. As used herein, ink generally means a handwritten stroke or strokes. Moreover, the strokes could be over-traced or overlapped. For either case, the system and method may automatically detect the correct shapes of the hand-drawn objects.

In specific, the system and method may detect the hand-drawn shape of containers and connectors in ink input. As used herein, a container means any closed drawing object, and a connector means any drawing object joining containers. Next, shape recognition may be performed for each container and each connector detected within the ink input. Then, chart recognition may be performed for containers and connectors recognized within the ink input.

As will be seen, a drawing may then be generated for each hand-drawn chart recognized within the ink input. To generate a drawing from a recognized hand-drawn chart, content detection and shape refinement may be performed. As will be understood, the various block diagrams, flow charts and scenarios described herein are only examples, and there are many other scenarios to which the present invention will apply.

Figure 2:
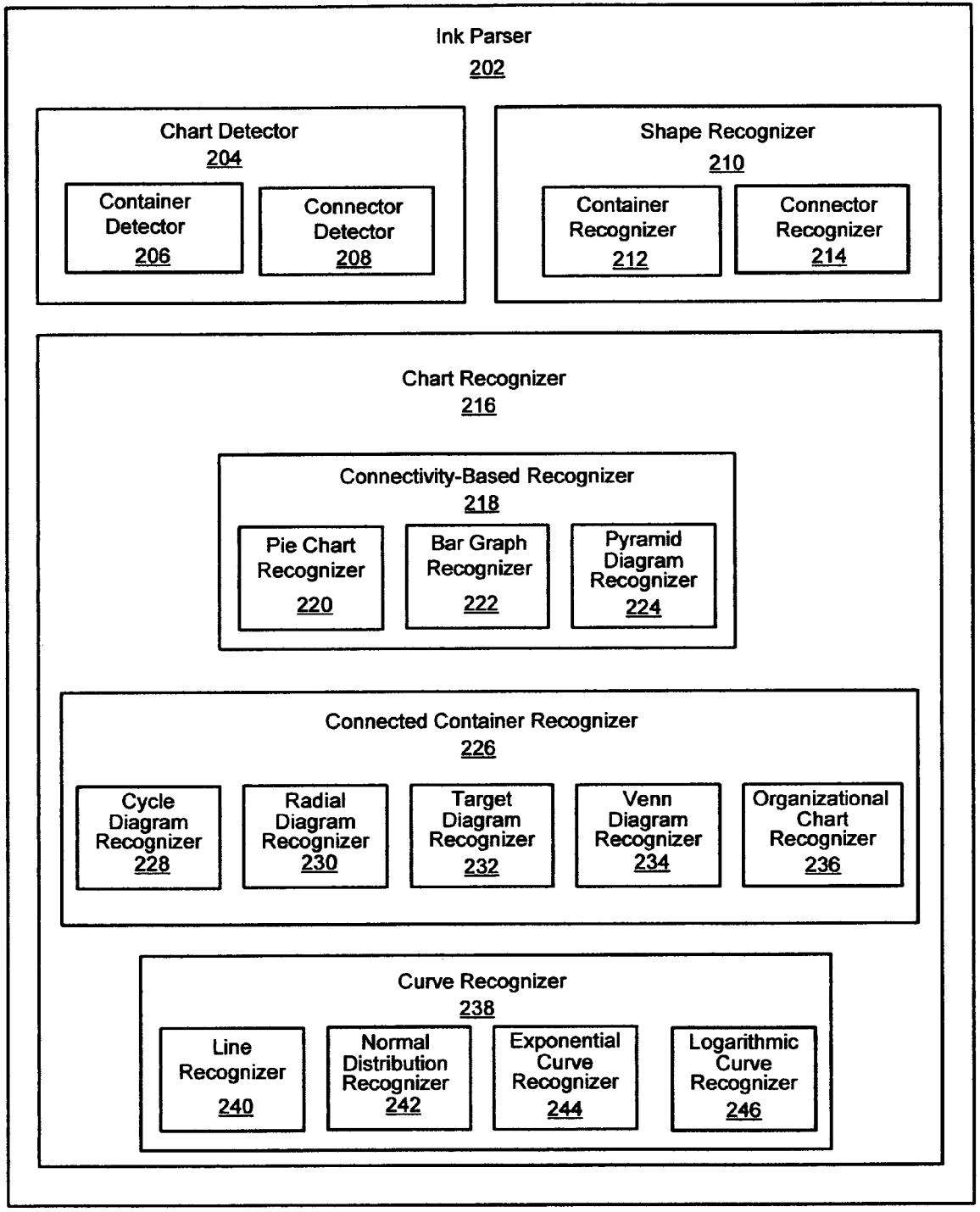
FIG. 2 is a block diagram generally representing an exemplary architecture of system components for recognition of hand-drawn charts in ink input, in accordance with an aspect of the present invention.

Turning to FIG. 2 of the drawings, there is shown a block diagram generally representing an exemplary architecture of system components for recognition of hand-drawn charts in ink input. Those skilled in the art will appreciate that the functionality implemented within the blocks illustrated in the diagram may be implemented as separate components or the functionality of several or all of the blocks may be implemented within a single component. For example, the functionality for the chart detector 204 may be included in the shape recognizer 210. Or the functionality of the container detector 206 may be implemented as a separate component from the chart detector 204.

The ink parser 202 may accept any ink, including ink with a drawing object. The ink parser 202 may include an operably coupled chart detector 204, an operably coupled shape recognizer 210, and an operably coupled chart recognizer 216. In general, the chart detector 204, the shape recognizer 210, and the chart recognizer 216 may be any type of executable software code such as a kernel component, an application program, a linked library, an object, and so forth. The chart detector 204 may include an operably coupled container detector 206 and an operably coupled connector detector 208. In an embodiment, the container detector 206 may find the strokes that belong to a container and the connector detector 208 may find the strokes that belong to a connector as described in more detail in U.S. patent application Ser. No. 10/850,948 entitled "System And Method For Detecting a Hand-Drawn Object in Ink Input," assigned to the same assignee as the present invention. The shape recognizer 210 may include an operably coupled container recognizer 212 and an operably coupled connector recognizer 214. In an embodiment, the container recognizer 212 may be used to recognize closed containers and the connector recognizer may be used to recognize unclosed connectors in a drawing such as a diagram or chart as described in more detail in U.S. patent application Ser. No. 10/850,718 entitled "System And Method For Shape Recognition of Hand-Drawn Objects," assigned to the same assignee as the present invention.

The chart recognizer 216 may include an operably coupled connectivity-based recognizer 218, an operably coupled connected container recognizer 226, and an operably coupled curve recognizer 238. The connectivity-based recognizer 218 may include any number of operably coupled recognizers for recognition of a diagram or chart with connected areas such as a pie chart recognizer 220, a bar graph recognizer 222, a pyramid diagram recognizer 224, and so forth. The connected container recognizer 226 may include any number of operably coupled recognizers for recognition of a diagram or chart with connected or intersecting containers such as cycle diagram recognizer 228, radial diagram recognizer 230, target diagram recognizer 232, Venn diagram recognizer 234, organizational chart recognizer 236, and so forth. The curve recognizer 238 may include any number of operably coupled recognizers for recognition of curves such as line recognizer 240, normal distribution recognizer 242, exponential curve recognizer 244, logarithmic curve recognizer 246, and so forth. Each of these components may also be any type of executable software code such as a kernel component, an application program, a linked library, an object, or other type of executable software code.

Figure 3:
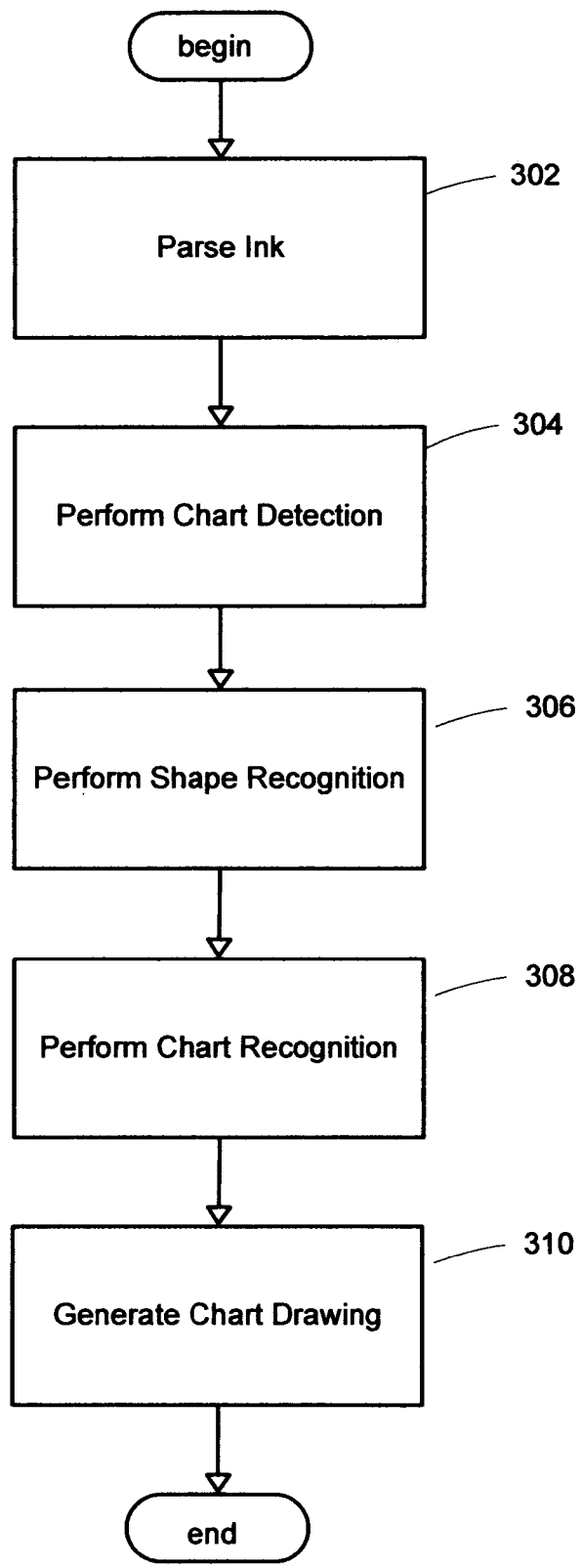
FIG. 3 is a flowchart generally representing the steps undertaken for recognition of hand-drawn charts in ink input, in accordance with an aspect of the present invention.

FIG. 3 presents a flowchart generally representing the steps undertaken for recognition of hand-drawn charts in ink input. At step 302, any ink may be parsed, including ink with a drawing object. For instance, in one embodiment, a page of ink may be accepted as input and parsed. In this embodiment, the ink parser, for example, may have no a priori knowledge of the ink on the page. Therefore, fundamental algorithms such as word grouping, writing/drawing classification and drawing grouping may be executed. In order to perform word grouping, strokes may be grouped into hierarchies of words, lines, and blocks. To do so, the word grouping process may include feature extraction of strokes to captures distance, geometric dissimilarity and linearity, and other stroke features. The word grouping process may also include dynamic programming to group the strokes according to temporal information. The word grouping process may also include clustering to group the strokes according to spatial information. The words, lines and blocks identified in the groups may not necessarily correspond to real semantic words, lines and blocks. In fact, these groups may include strokes of hand-drawn objects.

To perform writing/drawing classification, various features may be identified that may differentiate writing from drawing. For instance, single word features such as curvature, density, and other handwriting model features, may be used to differentiate writing from drawing. In one embodiment, context features such as temporal and spatial context features, may be used to differentiate writing from drawing. Each of the various features may be mapped to a fuzzy function, and classification between writing and drawing may be determined according to a combination of the fuzzy functions.

After performing word grouping and writing/drawing classification, the drawing strokes may be well organized by performing drawing grouping. To perform drawing grouping, the drawing strokes may be grouped into independent objects according to the spatial relationship among them. An efficient grid-based approach may be used for fitting the ink strokes into an image grid with an appropriate size. The image grid may be labeled to find connected components. Each connected component may correspond to a drawing object. Heuristic rules may then be applied to adjust the drawing objects.

At step 304, chart detection may be performed to group drawing strokes by finding all the strokes that may belong to a drawing object. Thus a user can draw diagrams and charts freely without any restriction on the input. For instance, one shape may have many strokes and the input order may be arbitrary. Moreover, the strokes could be over-traced or overlapped. For any of these cases, the system may automatically detect the correct shapes. In one embodiment, a hypergraph may be used to represent the diagrams and flow chart so that the relationship between containers and connectors may be fully represented. Thus, connectors that may join more than two containers may be supported in this embodiment.

In an embodiment, the container detector 206 may find the strokes that belong to a container and the connector detector 208 may find the strokes that belong to a connector as described in more detail in U.S. patent application Ser. No. 10/850,948 entitled "System And Method For Detecting a Hand-Drawn Object in Ink Input," assigned to the same assignee as the present invention. For example, an optimal search may be performed in time order to detect any containers. An efficient search may also be performed to detect containers and connectors. Finally, content detection may be performed for each detected container.

At step 306, shape recognition may be performed to recognize containers and connectors. After all of the strokes have been grouped for each container and each connector, the shape recognizer 210, in an embodiment, may be used to recognize closed containers and unclosed connectors in a drawing such as a diagram or chart as described in more detail in U.S. patent application Ser. No. 10/850,718 entitled "System And Method For Shape Recognition of Hand-Drawn Objects," assigned to the same assignee as the present invention. When recognized, the type, location, orientation and size of the shape can be provided. Advantageously, the order of stroke input and the number of strokes do not affect the recognition.

When shape recognition has been performed to recognize the closed containers and unclosed connectors, chart recognition may be performed at step 310 to recognize the type of diagram(s) and/or chart(s) formed by the closed containers and unclosed connectors recognized in the ink input. To do so, connectivity-based recognition may be performed in order to recognize any diagram or chart with connected areas such as a pie chart, a bar graph, a pyramid diagram, and so forth. Connected container recognition may also be performed in order to recognize any diagram or chart with connected or intersecting containers such as a cycle diagram, a radial diagram, a target diagram, a Venn diagram, an organizational chart, and so forth. Finally, curve recognition may be performed to recognize any diagram or chart with a curve such as a line segment, a normal distribution curve, an exponential curve, a logarithmic curve, and so forth. When chart recognition has been performed to recognize the diagram(s) and/or chart(s), the drawing of the diagram(s) and/or chart(s) may be generated at step 310.

Figure 4:
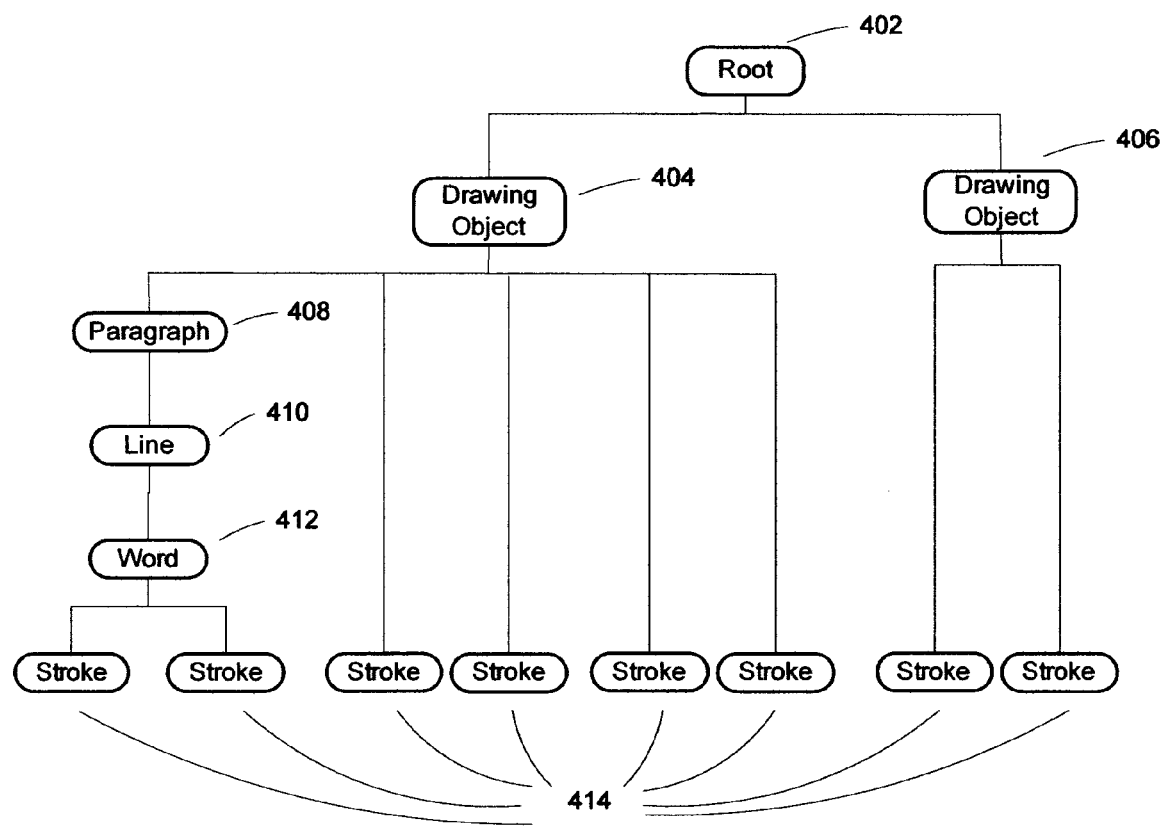
FIG. 4 is an exemplary illustration generally representing a structural relationship of handwritten objects in ink input for use in performing recognition of hand-drawn objects, in accordance with an aspect of the present invention.
Figure 6A:
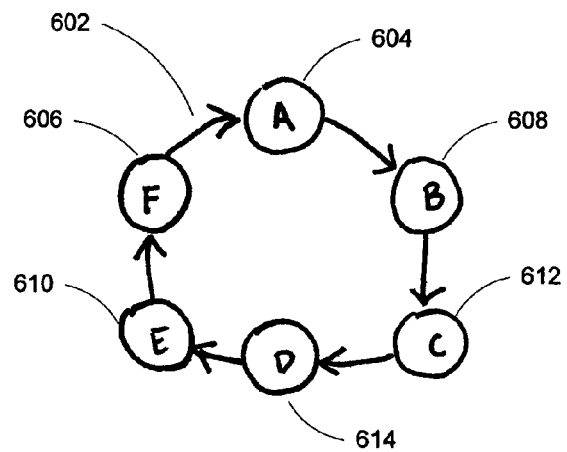
Figure 6B:
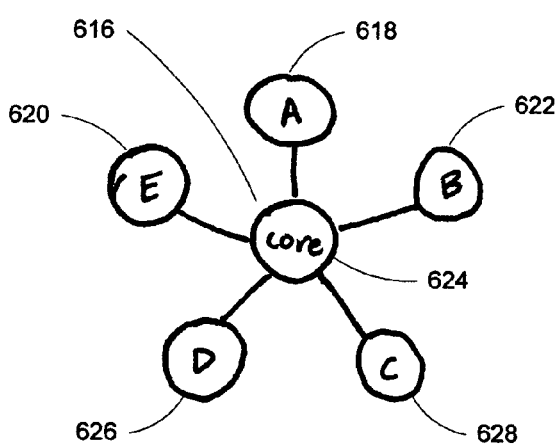
Figure 6C:
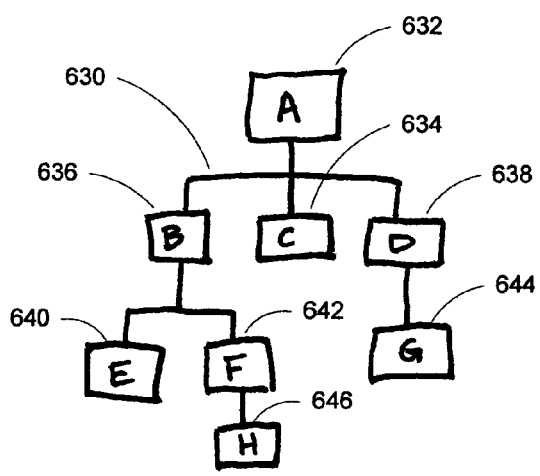
Figure 6D:
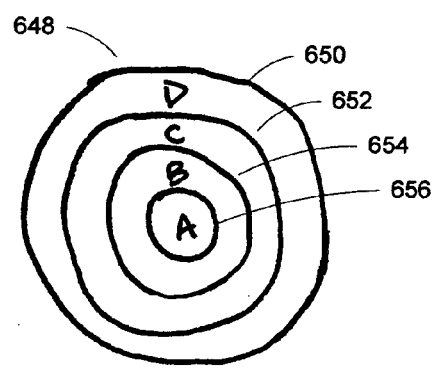

FIG. 4 presents an exemplary illustration generally representing a structural relationship of handwritten objects in ink input for use in performing recognition of hand-drawn objects. Root 402 may represent ink input, such as a page of ink input, that may include one or more drawing objects such as drawing objects 404 and 406. Drawing object 404 may have associated content such as text which may be structurally represented by paragraph 408 that may be made of line 410 which has a word 412 formed by strokes 414. Drawing objects 404 and 406 may be detected and recognized by performing detection and shape recognition of the hand-drawn objects within the ink input. The hand-drawn objects may be a drawing such as a diagram or a chart that may then be recognized by performing chart recognition.

FIGS. 5A-5D provide exemplary illustrations generally representing types of diagrams or charts that may be recognized, for example, by connectivity-based recognition. These types of diagrams or charts may include connected areas. For example, pie chart 502 in FIG. 5A may include connected areas 504, 506, 508 and 510. Pie chart 512 in FIG. 5B may include connected areas 514 and 516. Bar chart 518 in FIG. 5C may include connected areas 520, 522 and 524. And pyramid diagram 526 in FIG. 5D may include connected areas 528, 530, 532 and 534.

FIGS. 6A-6F provide exemplary illustrations generally representing types of diagrams or charts that may be recognized, for example, by connected container recognition. These types of diagrams or charts may include connected or intersecting containers. For example, circle diagram 602 in FIG. 6A may include connected containers 604, 606, 608, 610, 612 and 614. Radial diagram 616 in FIG. 6B may include connected containers 618, 620, 622, 624, 626, and 628. Organizational chart 630 in FIG. 6C may include connected containers 632, 634, 636, 638, 640, 642, 644, and 646. Target diagram 648 in FIG. 6D may include intersecting containers 650, 652, 654, and 656. Venn diagram 658 in FIG. 6E may include intersecting containers 660, 662 and 664. And Venn diagram 666 may include intersecting containers 668, 670, 672, 674, 676, and 678.

FIGS. 7A-7B provide exemplary illustrations generally representing types of diagrams or charts that may be recognized, for example, by curve recognition. These types of diagrams or charts may include a line segment or curve. For example, chart 702 in FIG. 7A may include normal distribution curves 704 and 706. And chart 708 in FIG. 7B may include line segment 710, logarithmic curve 712, and exponential curve 714.

Figure 8:
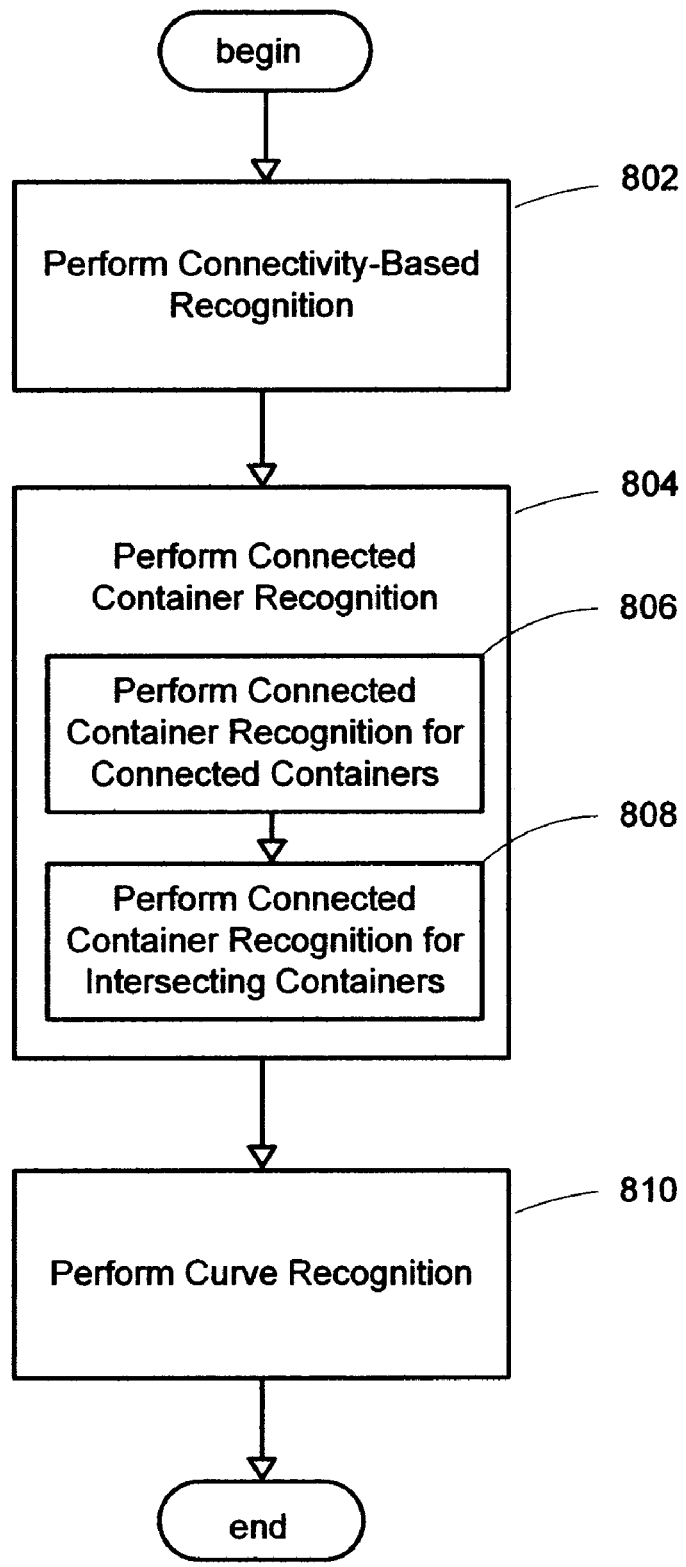
FIG. 8 is a flowchart generally representing one embodiment of the steps undertaken for performing chart recognition of the type of diagram(s) and/or chart(s) formed by the closed containers and unclosed connectors recognized in ink input, in accordance with an aspect of the present invention.

FIG. 8 presents a flowchart generally representing one embodiment of the steps undertaken for performing chart recognition of the type of diagram(s) and/or chart(s) formed by the closed containers and unclosed connectors recognized in the ink input. Connectivity-based recognition may be performed at step 802 to recognized types of diagrams or charts that may include connected areas, such as a pie chart, a bar chart, a pyramid chart and so forth. Next, connected container recognition may be performed at step 804 to recognize types of diagrams or charts that may include connected containers or intersecting containers such as a cycle diagram, a radial diagram, an organizational chart, a target diagram, a Venn diagram, and so forth. In an embodiment, connected container recognition may be performed at step 806 for connected containers and then connected container recognition may be performed at step 808 for intersecting containers. At step 810, curve recognition may then be performed to recognize types of diagrams or charts that may include a line segment or curve such as a normal distribution, a logarithmic curve, an exponential curve, and so forth.

Figure 9:
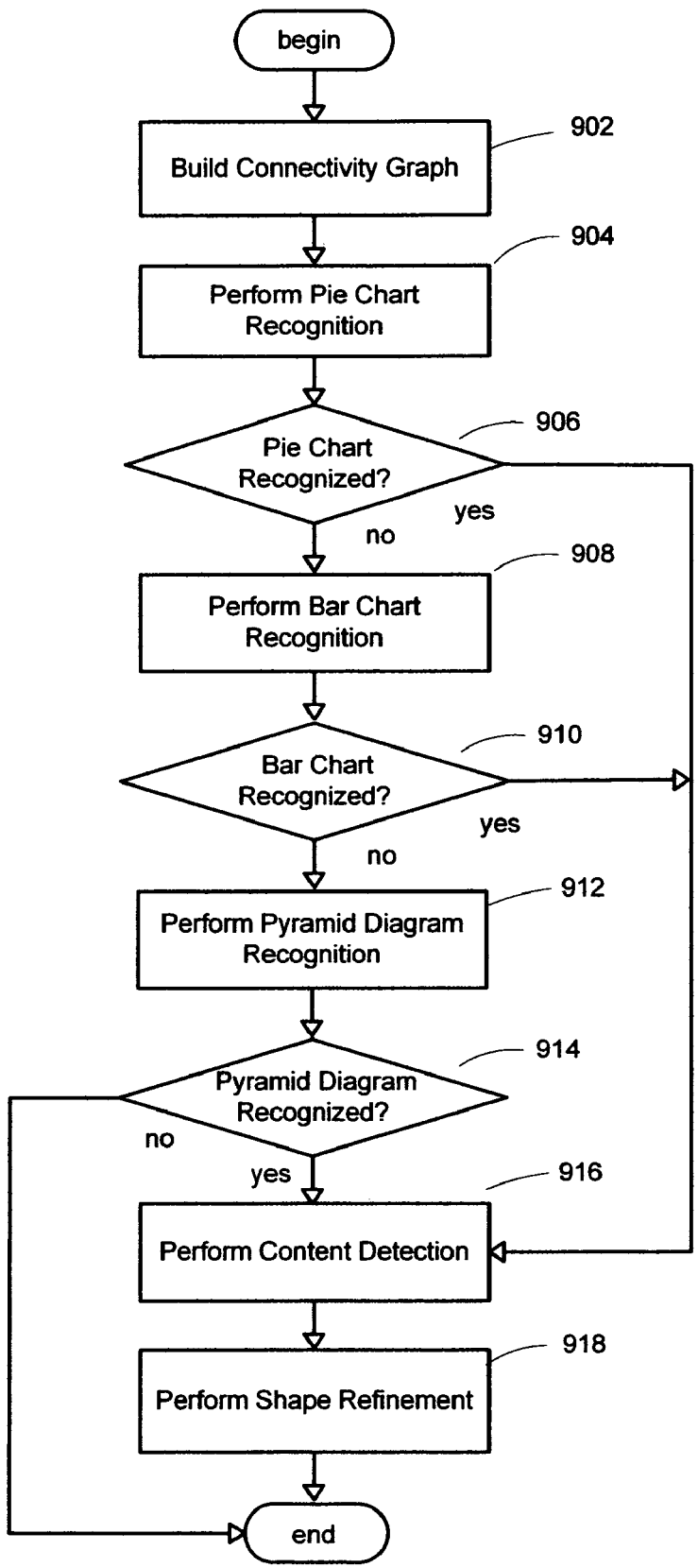
FIG. 9 is a flowchart generally representing one embodiment of the steps undertaken for performing connectivity-based recognition of the closed containers and unclosed connectors recognized in ink input, in accordance with an aspect of the present invention.

FIG. 9 presents a flowchart generally representing one embodiment of the steps undertaken for performing connectivity-based recognition of the closed containers and unclosed connectors recognized in the ink input. At step 902, a connectivity graph of the recognized containers and recognized connectors may be built. At step 904, pie chart recognition may be performed for the connectivity graph built. Next, it may be determined at step 906 whether a pie chart may be recognized from the connectivity graph. If so, then content detection may be performed at step 916. Otherwise, bar chart recognition may be performed for the connectivity graph at step 908. It may be determined at step 910 whether a bar chart may be recognized from the connectivity graph. If so, then content detection may be performed at step 916. Otherwise, pyramid diagram recognition may be performed for the connectivity graph at step 912. It may be determined at step 914 whether a pyramid diagram may be recognized from the connectivity graph. If so, then content detection may be performed at step 916. Otherwise, processing may be finished.

In an embodiment, content detection may be performed for each text word by determining the intersection between its bounding box and each connected area. If the largest area ratio between the intersection and the word's bounding box is greater than 0.8, it may be considered to be the content of the corresponding connected area.

The shape of the recognized diagram or chart may be refined at step 918. For example, the ratios between the fans of a pie chart may be adjusted to accommodate any recognized contents corresponding to the connected areas of the pie chart. In the case of a bar graph, the heights of the bars may be adjusted, for example, to accommodate any recognized contents corresponding to the connected areas of the bar chart. The widths of the bars may also be adjusted to be the same width and the positions of the bar clusters may be adjusted to be the same distance apart. Shape refinement may also be performed for pyramid diagrams. For example, the layers of a pyramid diagram may be adjusted to be the same height.

FIGS. 10A-10D provide exemplary illustrations generally representing types of diagrams or charts recognized by connectivity-based recognition for which shape refinement has been performed. For example, pie chart 1002 in FIG. 10A may illustrate the result of shape refinement after recognition of hand-drawn pie chart 502 in FIG. 5A. Similarly, pie chart 1004 in FIG. 10B may illustrate the result of shape refinement after recognition of hand-drawn pie chart 512 in FIG. 5B. Bar chart 1006 in FIG. 10C may illustrate the result of shape refinement after recognition of hand-drawn bar chart 518 in FIG. 5C. And pyramid diagram 1008 in FIG. 10D may illustrate the result of shape refinement after recognition of hand-drawn pyramid diagram 526 in FIG. 5D.

Figure 11:
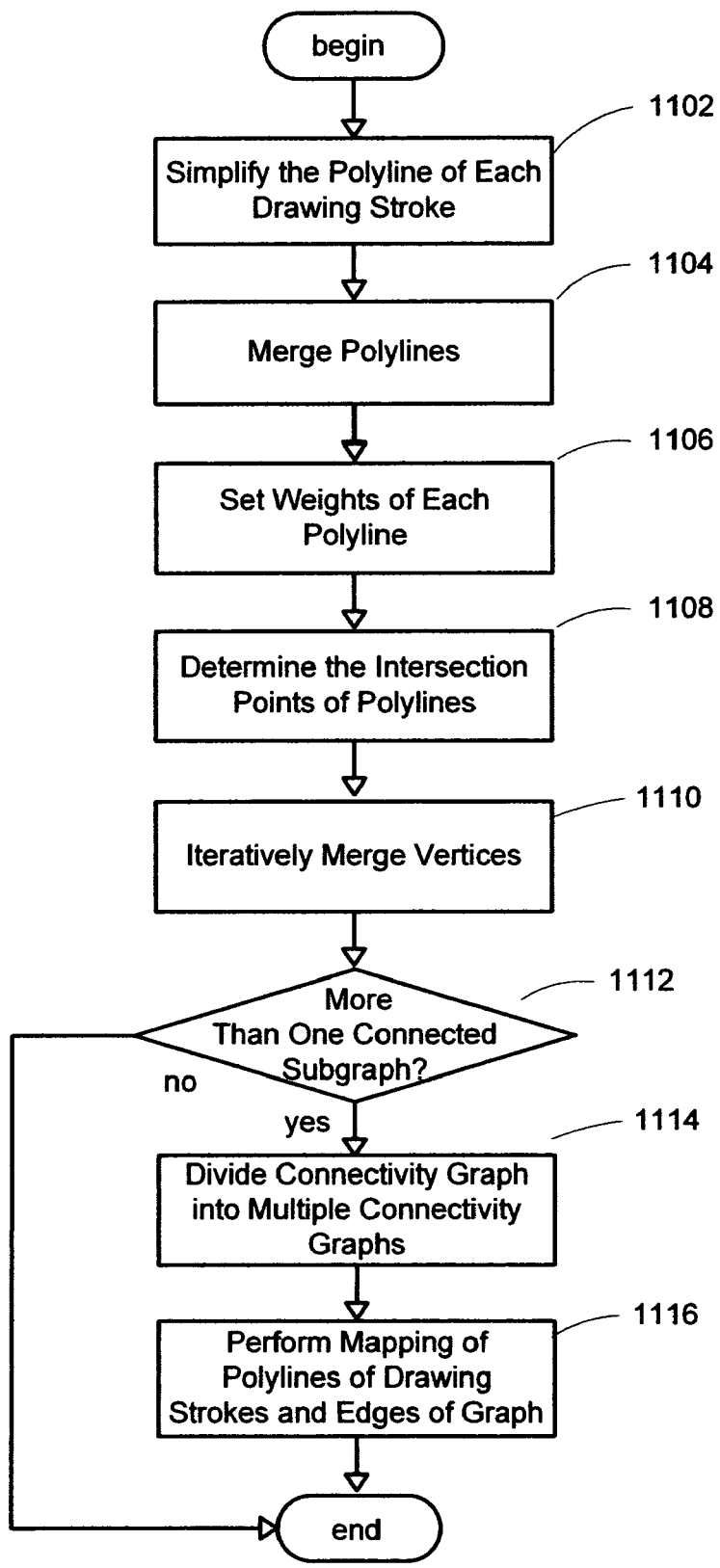
FIG. 11 is a flowchart generally representing one embodiment of the steps undertaken for building a connectivity graph of the containers and connectors recognized in the ink input, in accordance with an aspect of the present invention.

FIG. 11 presents a flowchart generally representing one embodiment of the steps undertaken for building a connectivity graph of the containers and connectors recognized in the ink input. At step 1102, the polyline of each drawing stroke may be simplified. In one embodiment, the polyline may be simplified by applying Sklansky's polyline approximation (which may be found in Sklansky J. and Gonzalez V., Fast Polygonal Approximation of Digitized Curves, Pattern Recognition, Vol. 12, pp. 327-331, 1980). At step 1104, polylines may be merged. In an embodiment, the polylines may be merged using the method for merging skeleton strokes or stroke pieces as described in more detail in U.S. patent application Ser. No. 10/850,718 entitled "System And Method For Shape Recognition of Hand-Drawn Objects," assigned to the same assignee as the present invention. At step 1106, weights for each polyline may be set. At step 1108, the intersection points of polylines may be determined. In one embodiment, the regular intersection points of two arbitrary line segments of the polylines may be determined, where the "regular" means that the intersection point is inside the two line segments. Next, the length of the first and last line segments of each polyline may be prolonged by 25 percent of its length and the intersection points with other line segments may be determined by calculating the weight of the intersection points. For two line segment $\overrightarrow{AB}$ and $\overrightarrow{CD}$, the weight of the intersection point M may be defined to be:

$$\text{weight}(M) = \max(\min(\text{weight}(A), \text{weight}(B)), \min(\text{weight}(C), \text{weight}(D))).$$

At step 1110, vertices may be iteratively merged. In an embodiment, the vertex pair with the least merging score may be iteratively merged until the least merging score exceeds a threshold. In an embodiment, the threshold may be 0.15 and the merging score of two vertices may be defined to be the distance between the two original points divided by the minimal weight of the two vertices. It may then be determined at step 1112 whether there may be more than one connected subgraph. If not, processing may be finished. Otherwise, the connectivity graph may be divided into multiple connectivity graphs at step 1114. Then a mapping of the polylines of the drawing strokes and edges of the graph may be performed at step 1116 and processing may be finished. In one embodiment, the mapping of the polylines of the drawing strokes and edges of the graph may be accomplished by computing the nearest edge in the graph of each line segment of the original polylines.

Figure 12:
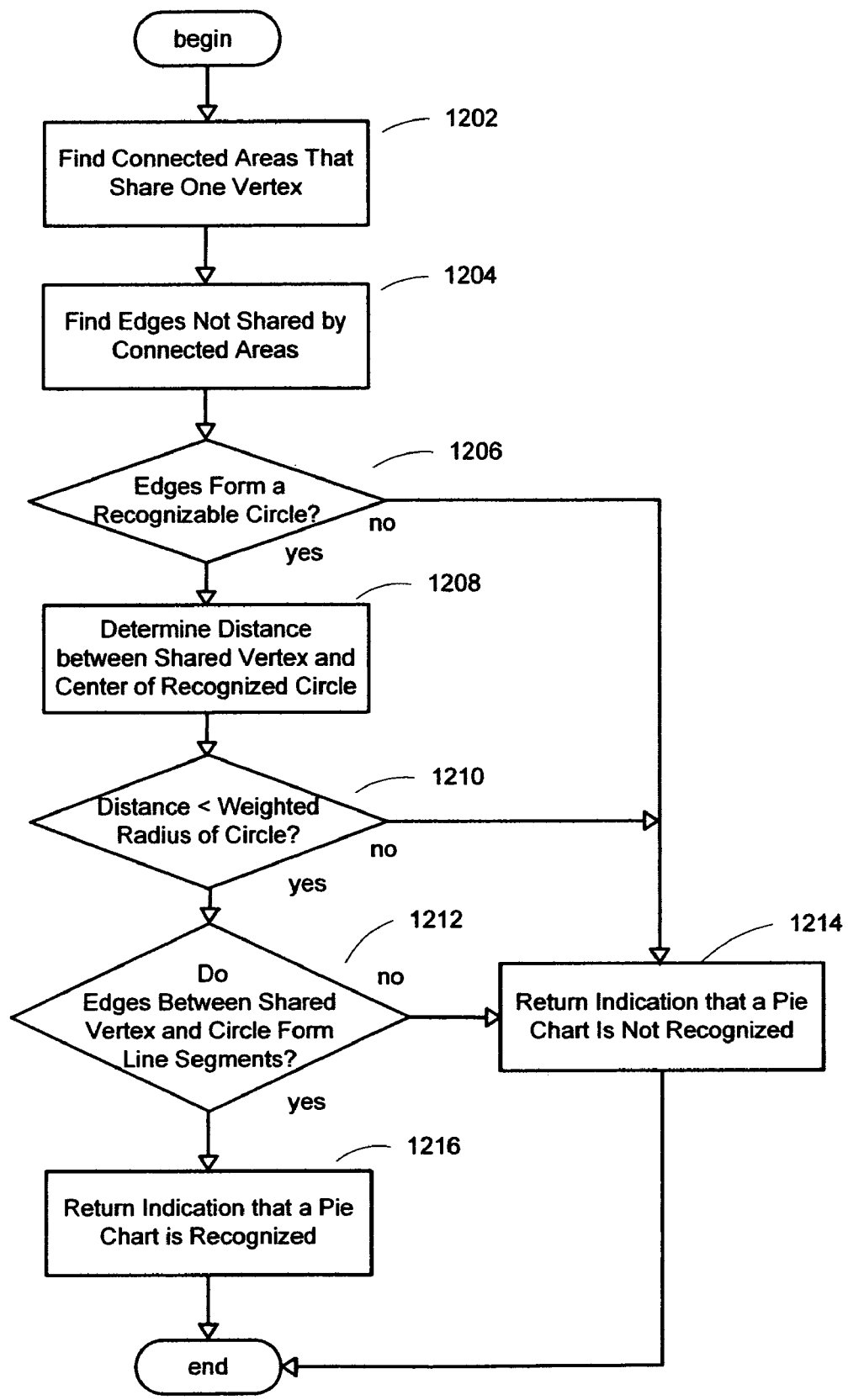
FIG. 12 is a flowchart generally representing one embodiment of the steps undertaken for performing pie chart recognition from a connectivity graph of the containers and connectors recognized in ink input, in accordance with an aspect of the present invention.

FIG. 12 presents a flowchart generally representing one embodiment of the steps undertaken for performing pie chart recognition from a connectivity graph of the containers and connectors recognized in ink input. At step 1202, connected areas of the connectivity graph that may share one vertex may be found. In an embodiment, each single connected area may be detected by applying the line arrangement methods (which may be found in Joseph O'Rourke, Computational Geometry in C, pp. 205-212. Cambridge University Press, New York, 1994.)

At step 1204, edges of the connectivity graph that are not shared by connected areas may be found. It may be determined at step 1206 whether the edges of the connectivity graph that are not shared by connected areas form a recognizable circle. In an embodiment, shape recognition may be performed upon the edges by using the method for recognizing the shape of a circle from drawing strokes as described in more detail in U.S. patent application Ser. No. 10/850,718 entitled "System And Method For Shape Recognition of Hand-Drawn Objects," assigned to the same assignee as the present invention.

If the edges of the connectivity graph that are not shared by connected areas do not form a recognizable circle, then an indication that a pie chart is not recognized may be returned at step 1214. If so, then the distance between the shared vertex and the center of the recognized circle may be determined at step 1208. It may then be determined at step 1210 whether the distance between the shared vertex and the center of the recognized circle may be less than the weighted radius of the recognized circle. If not, then an indication that a pie chart is not recognized may be returned at step 1214. If so, then it may be determined at step 1212 whether the edges between the shared vertex and the recognized circle are line segments. In an embodiment, the minimal bounding box of the polylines may be determined and, if the ratio between maximum (height, width) and minimum(height, width) of the bounding box may be greater than 5, then the polylines are considered to be a line segment. If not, then an indication that a pie chart is not recognized may be returned at step 1214. Otherwise, if the edges from the vertex of the recognized circle are line segments then an indication that a pie chart is recognized may be returned at step 1216 and processing may be finished.

Figure 13:
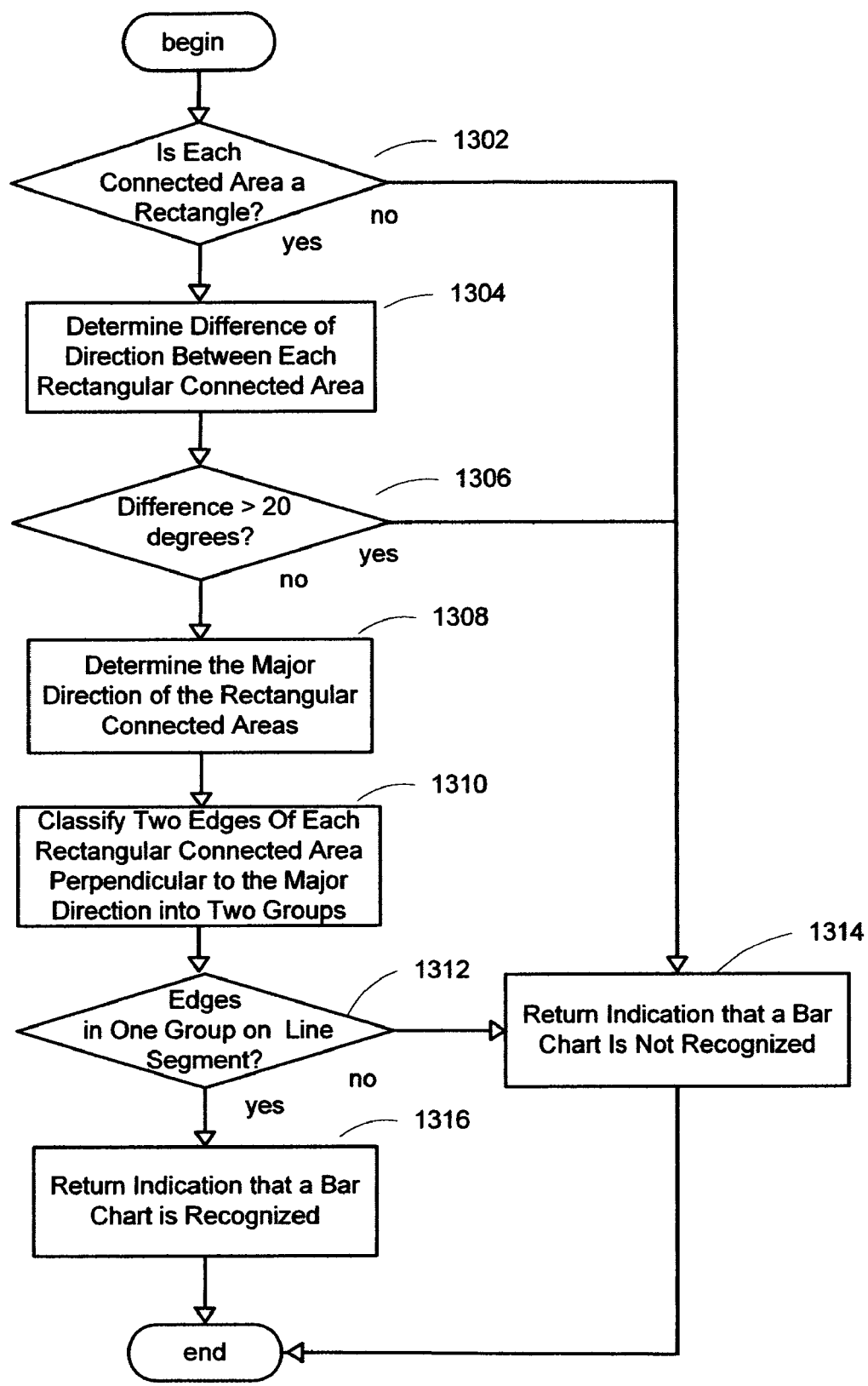
FIG. 13 is a flowchart generally representing one embodiment of the steps undertaken for performing bar chart recognition from a connectivity graph of the containers and connectors recognized in ink input, in accordance with an aspect of the present invention.

FIG. 13 presents a flowchart generally representing one embodiment of the steps undertaken for performing bar chart recognition from a connectivity graph of the containers and connectors recognized in ink input. At step 1302, it may be determined whether each connected area of the connectivity graph may be a rectangle. If not, then an indication that a bar chart is not recognized may be returned at step 1314. Otherwise, if each connected area of the connectivity graph may be a rectangle, then the difference of the direction of each rectangular connected area may be determined at step 1304. The direction of a rectangle may be defined to be the angle between the longer edge and Y-axis. It may then be determined at step 1306 whether the difference of the direction of each rectangular connected area may be greater than 20 degrees. In an embodiment, the difference between direction A and B may be defined to be min(|A−B|,|π/2−A+B|). If the difference of the direction of each rectangular connected area may be greater than 20 degrees, then an indication that a bar chart is not recognized may be returned at step 1314. If difference of the direction of each rectangular connected area may not be greater than 20 degrees, then the major direction of the rectangular connected areas may be determined at step 1308. The major direction may be determined by computing the mean value of the directions (or the complementary angles) of the rectangular connected areas. Next, the two edges of each rectangular connected area that may be perpendicular to the major direction may be classified at step 1310 into two groups. In an embodiment, the edge that may be farther from the origin may be classified into a first group and the other edge may be classified into a second group. It may then be determined at step 1312 whether all the edges from one of the groups may be on a line segment. In an embodiment, it may be determined whether the edges may be connected and their original polylines could be a line segment by computing the minimal bounding box of the polylines and, if the ratio between maximum(height, width) and minimum (height, width) of the bounding box may be greater than 5, then the polylines are considered to be a line segment. If not, then an indication that a bar chart is not recognized may be returned at step 1314. If so, then an indication that a bar chart is recognized may be returned at step 1316. The shared line segment may be considered the X-axis of the bar graph. The Y-axis may be recognized from the edges perpendicular to the X-axis. And the arrow heads of the X and Y axis may be recognized using the shape recognizer.

Figure 14:
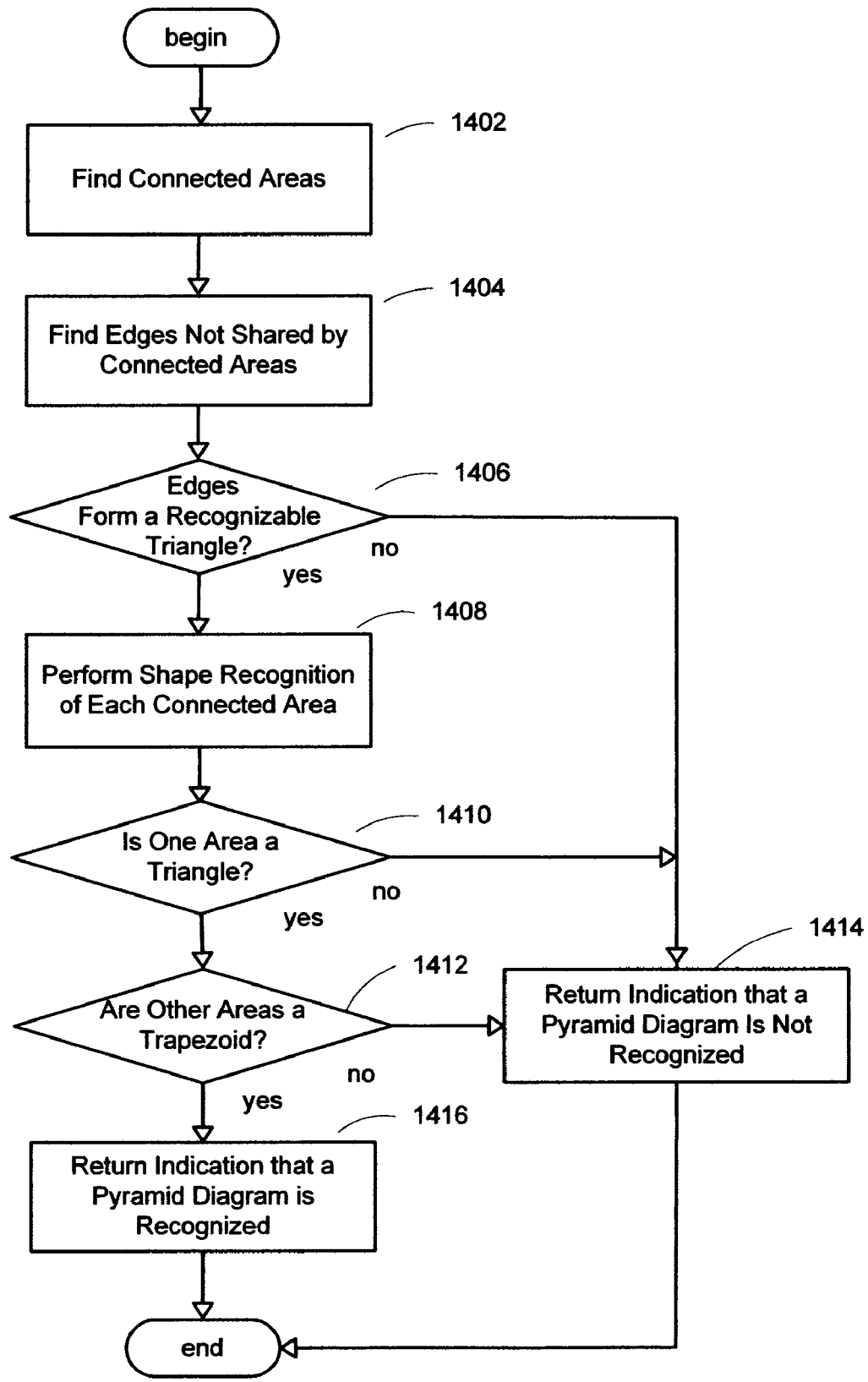
FIG. 14 is a flowchart generally representing one embodiment of the steps undertaken for performing pyramid diagram recognition from a connectivity graph of the containers and connectors recognized in ink input, in accordance with an aspect of the present invention.

FIG. 14 presents a flowchart generally representing one embodiment of the steps undertaken for performing pyramid diagram recognition from a connectivity graph of the containers and connectors recognized in ink input. At step 1402, connected areas of the connectivity graph may be found. At step 1404, edges of the connectivity graph that are not shared by connected areas may be found. It may be determined at step 1406 whether the edges of the connectivity graph that are not shared by connected areas form a recognizable triangle. In one embodiment, it may be determined whether the edges form an isosceles triangle. If not, then an indication that a pyramid diagram is not recognized may be returned at step 1414. If the edges of the connectivity graph that are not shared by connected areas form a recognizable triangle, then shape recognition may be performed for each connected area at step 1408. It may then be determined at step 1410 whether there is one connected area that may be a triangle. If not, then an indication that a pyramid diagram is not recognized may be returned at step 1414. Otherwise, then it may be determined at step 1412 whether the other connected areas may be trapezoids. If the other connected areas may not be trapezoids, then an indication that a pyramid diagram is not recognized may be returned at step 1414. If the other connected areas may be trapezoids, then an indication that a pyramid diagram is recognized may be returned at step 1416.

Figure 15:
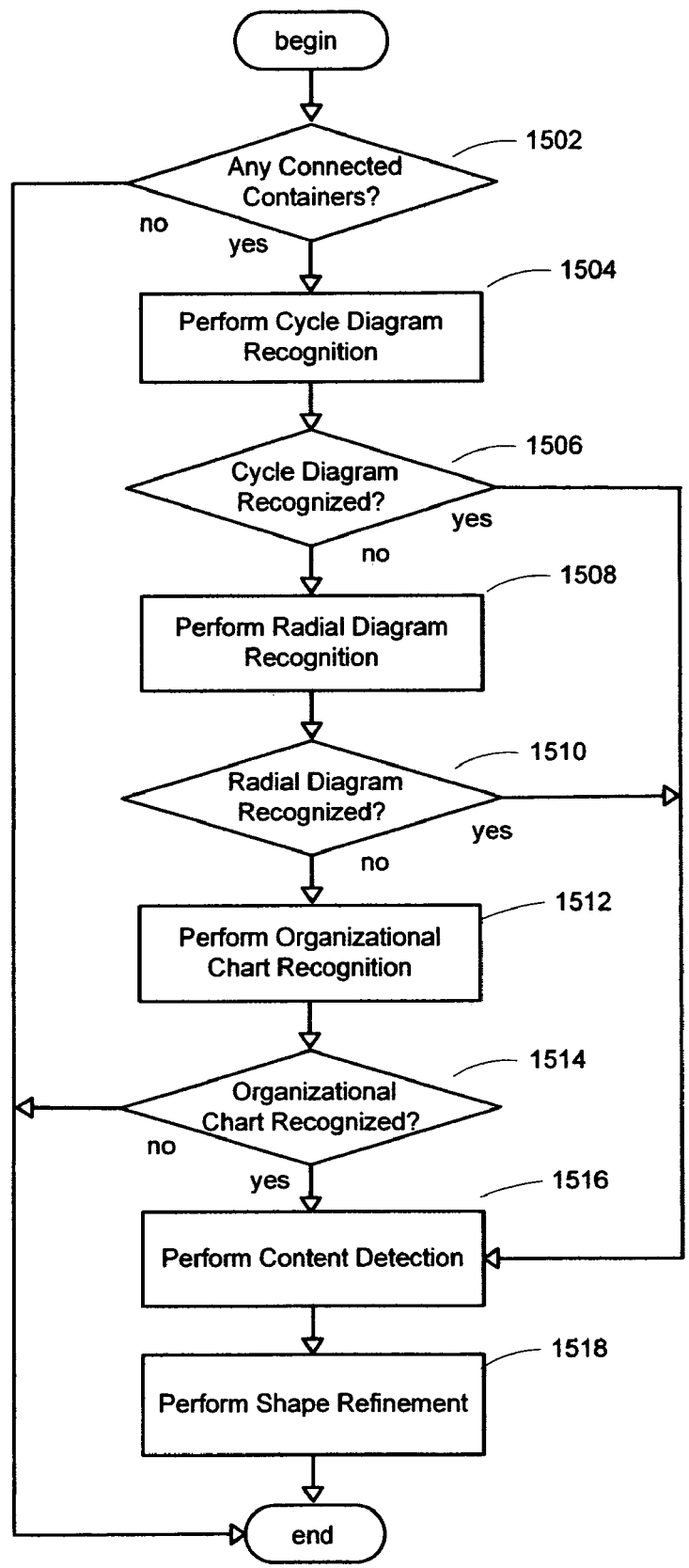
FIG. 15 is a flowchart generally representing one embodiment of the steps undertaken for performing connected container recognition of the closed containers and unclosed connectors recognized in the ink input, in accordance with an aspect of the present invention.

FIG. 15 presents a flowchart generally representing one embodiment of the steps undertaken for performing connected container recognition of the closed containers and unclosed connectors recognized in the ink input. At step 1502, it may be determined whether there are any connected containers recognized in the ink input. If not, processing may be finished. Otherwise, cycle diagram recognition may be performed at step 1504. Next, it may be determined at step 1506 whether a cycle diagram may be recognized from the connected containers. If so, then content detection may be performed at step 1516. Otherwise, radial diagram recognition may be performed at step 1508. It may be determined at step 1510 whether a radial diagram may be recognized from the connected containers. If so, then content detection may be performed at step 1516. Otherwise, organizational chart recognition may be performed at step 1512. It may be determined at step 1514 whether an organizational chart may be recognized from the connected containers. If so, then content detection may be performed at step 1516. Otherwise, processing may be finished.

In an embodiment, content detection may be performed for each text word by determining the intersection between its bounding box and each connected area. If the largest area ratio between the intersection and the word's bounding box is greater than 0.8, it may be considered to be the content of the corresponding connected area.

The shape of the recognized diagram or chart may be refined at step 1518. For example, the radius of each circle in a cycle diagram may be set to the mean radius of all the containers and each circle may be evenly distributed around the barycenter of the diagram. In the case of a radial diagram, the radius of each circle in a radial diagram may be set to the mean radius of all the containers and each container with one related connector may be evenly distributed around the centroid container. Shape refinement may also be performed for organizational charts. For example, each rectangular container may be set to the mean size of the rectangular containers recognized. Also, the vertical distances between rectangular containers may be set to be the same distance apart and the horizontal distances between rectangular containers may be set to be the same distance apart.

Figure 16A:
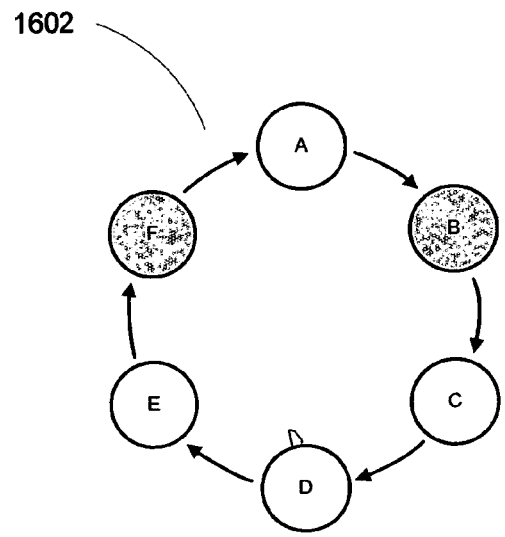
FIGS. 16A-16C are exemplary illustrations generally representing types of diagrams or charts recognized by connected container recognition for which shape refinement has been performed, in accordance with an aspect of the present invention.
Figure 16B:
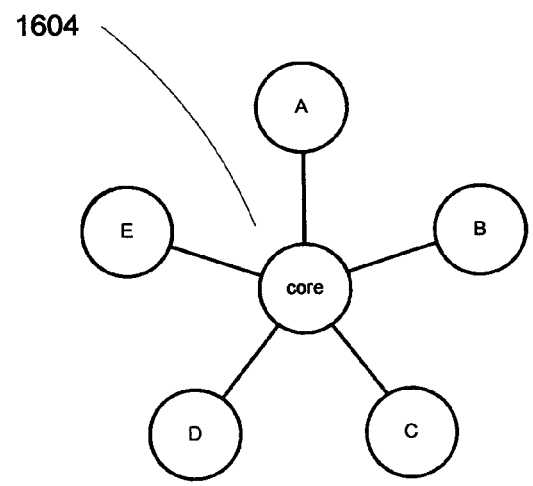
Figure 16C:
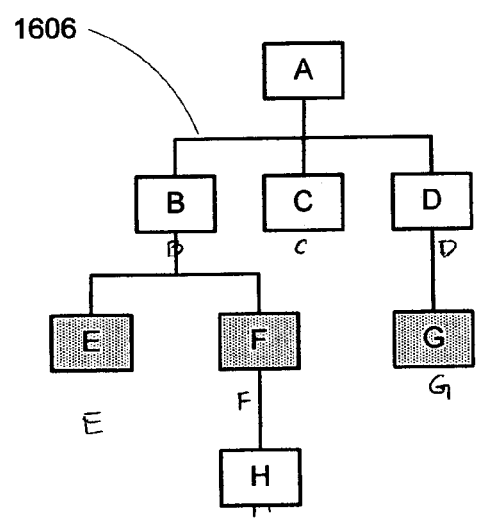

FIGS. 16A-16C provide exemplary illustrations generally representing types of diagrams or charts recognized by connected container recognition for which shape refinement has been performed. For example, cycle diagram 1602 in FIG. 16A may illustrate the result of shape refinement after recognition of hand-drawn cycle diagram 602 in FIG. 6A. Similarly, radial diagram 1604 in FIG. 16B may illustrate the result of shape refinement after recognition of hand-drawn radial diagram 616 in FIG. 6B. And organizational chart 1606 in FIG. 16C may illustrate the result of shape refinement after recognition of hand-drawn organizational chart 630 in FIG. 6C.

Figure 17:
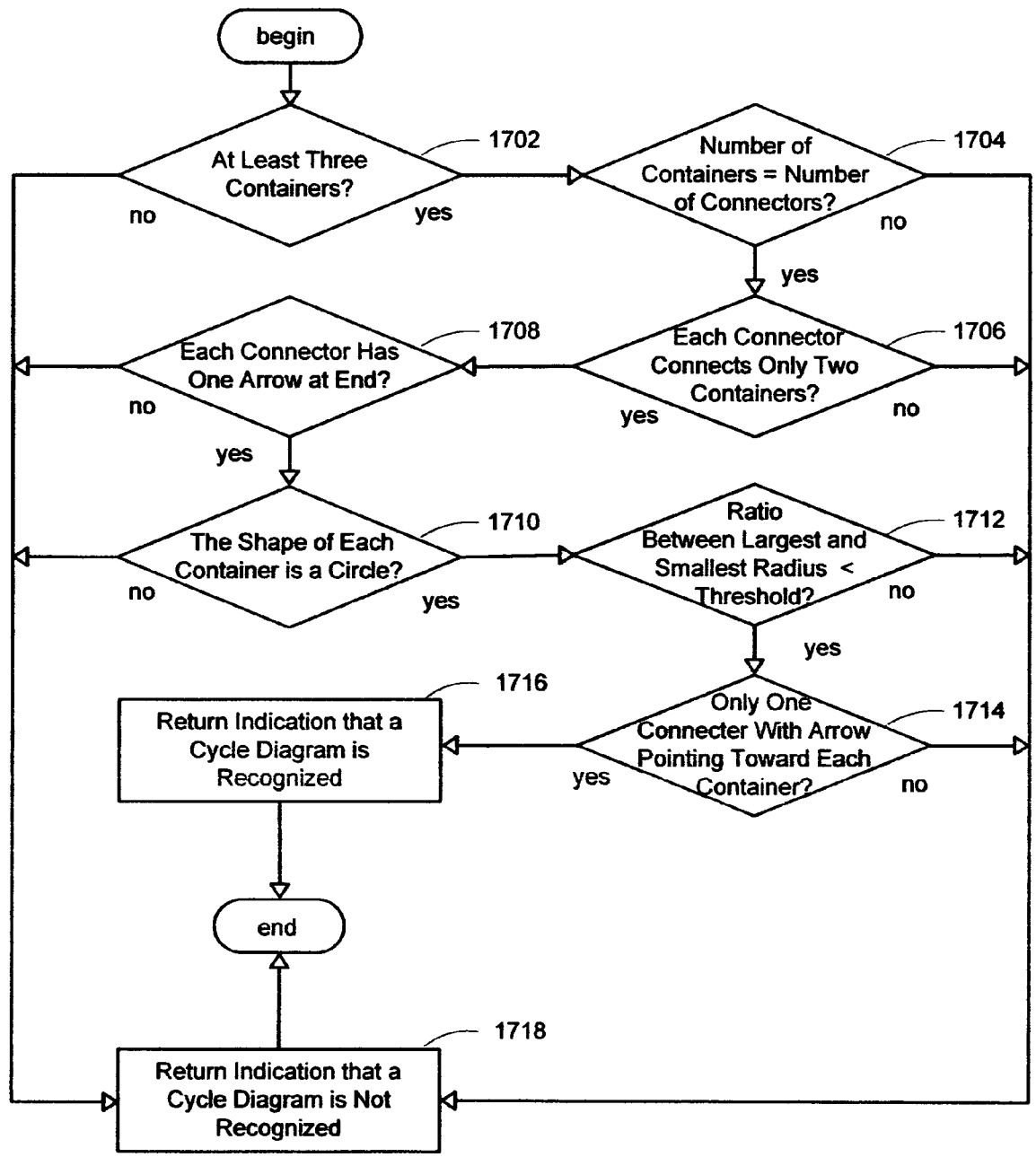
FIG. 17 is a flowchart generally representing one embodiment of the steps undertaken for performing cycle diagram recognition from the containers and connectors recognized in ink input, in accordance with an aspect of the present invention.

FIG. 17 presents a flowchart generally representing one embodiment of the steps undertaken for performing cycle diagram recognition from the containers and connectors recognized in ink input. At step 1702, it may be determined whether there are at least three containers among the containers recognized in ink input. If not, then an indication that a cycle diagram is not recognized may be returned at step 1718. Otherwise, it may be determined at step 1704 whether the number of containers equals the number of connectors. If not, then an indication that a cycle diagram is not recognized may be returned at step 1718. If the number of containers equals the number of connectors, next it may be determined at step 1706 whether each connector connects only two containers. If so, then it may be determined at step 1708 whether each connector has an arrow only at one end, else an indication that a cycle diagram is not recognized may be returned at step 1718. If each connector does not have an arrow only at one end, then an indication that a cycle diagram is not recognized may be returned at step 1718. Otherwise, it may be determined at step 1710 whether the shape of each container may be a circle. If not, then an indication that a cycle diagram is not recognized may be returned at step 1718. If the shape of each container may be a circle, it may then be determined at step 1712 whether the ratio between the radius of the largest circle and the radius of the smallest circle may be less than a specific threshold. In an embodiment, the threshold may be 2. If the ratio is not less than the specific threshold, an indication that a cycle diagram is not recognized may be returned at step 1718. If the ratio is less than the specific threshold, it may be determined at step 1714 whether the arrow of only one connector may be pointing toward each container. If so, then an indication that a cycle diagram is recognized may be returned at step 1716 and processing may be finished. Otherwise, an indication that a cycle diagram is not recognized may be returned at step 1718 and processing may be finished.

Figure 18:
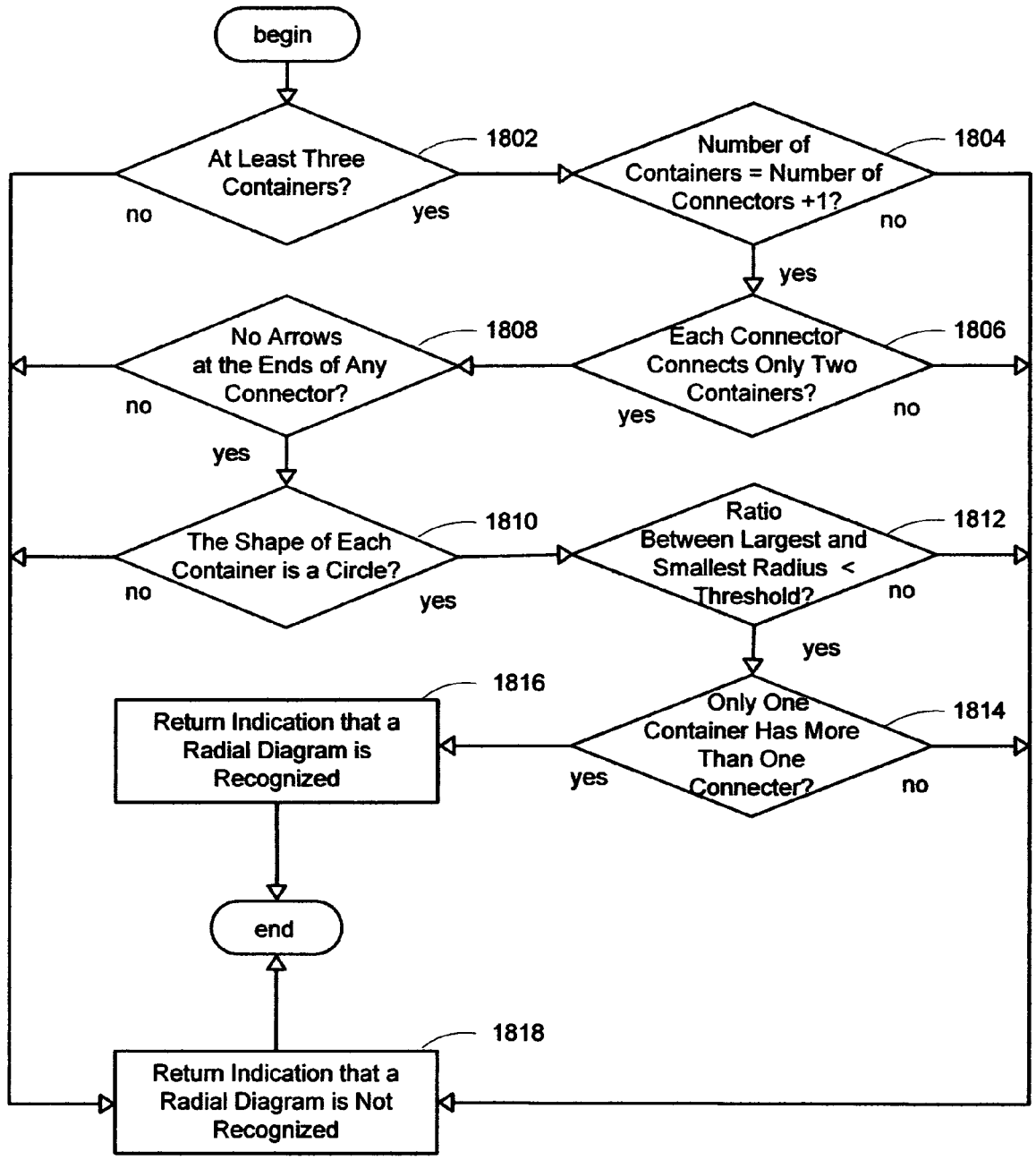
FIG. 18 is a flowchart generally representing one embodiment of the steps undertaken for performing radial diagram recognition from the containers and connectors recognized in ink input, in accordance with an aspect of the present invention.

FIG. 18 presents a flowchart generally representing one embodiment of the steps undertaken for performing radial diagram recognition from the containers and connectors recognized in ink input. At step 1802, it may be determined whether there are at least three containers among the containers recognized in ink input. If not, then an indication that a radial diagram is not recognized may be returned at step 1818. Otherwise, it may be determined at step 1804 whether the number of containers equals the number of connectors plus one. If not, then an indication that a radial diagram is not recognized may be returned at step 1818. If the number of containers equals the number of connectors plus one, next it may be determined at step 1806 whether each connector connects only two containers. If so, then it may be determined at step 1808 whether any connector has any arrows at its ends, else an indication that a radial diagram is not recognized may be returned at step 1818. If any connector has any arrows at its ends, then an indication that a radial diagram is not recognized may be returned at step 1818. Otherwise, it may be determined at step 1810 whether the shape of each container may be a circle. If not, then an indication that a radial diagram is not recognized may be returned at step 1818. If the shape of each container may be a circle, it may then be determined at step 1812 whether the ratio between the radius of the largest circle and the radius of the smallest circle may be less than a specific threshold. In an embodiment, the threshold may be 2. If the ratio is not less than the specific threshold, an indication that a radial diagram is not recognized may be returned at step 1818. If the ratio is less than the specific threshold, it may be determined at step 1814 whether only one container may have more than one connector. If so, then an indication that a radial diagram is recognized may be returned at step 1816 and processing may be finished. Otherwise, an indication that a radial diagram is not recognized may be returned at step 1818 and processing may be finished.

Figure 19:
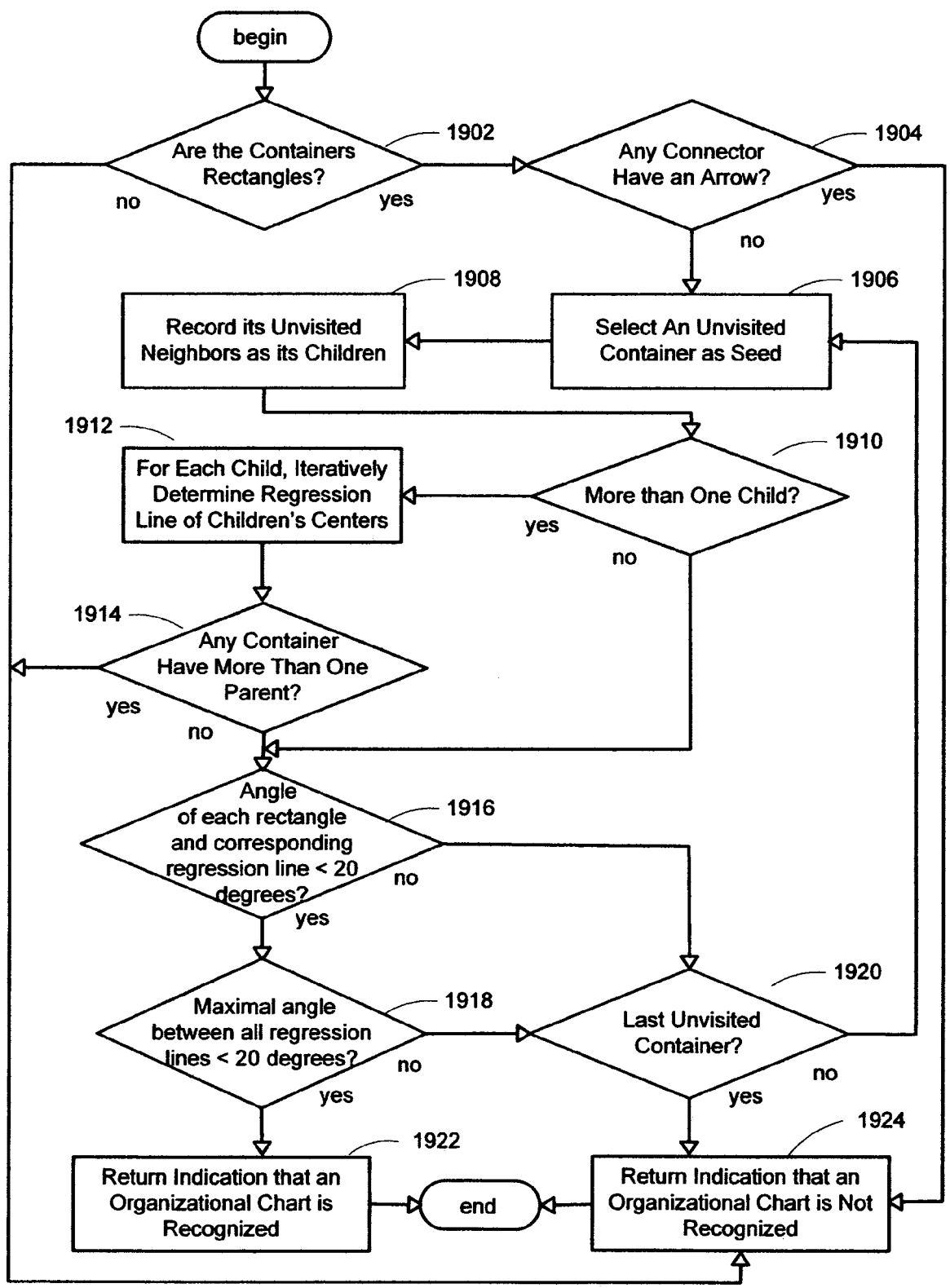
FIG. 19 is a flowchart generally representing one embodiment of the steps undertaken for performing organizational chart recognition from the containers and connectors recognized in ink input, in accordance with an aspect of the present invention.

FIG. 19 presents a flowchart generally representing one embodiment of the steps undertaken for performing organizational chart recognition from the containers and connectors recognized in ink input. At step 1902, it may be determined whether the containers recognized in ink input may be rectangles. If not, then an indication that an organizational chart is not recognized may be returned at step 1924. Otherwise, it may be determined at step 1904 whether any connector has any arrows at its ends. If any connector has any arrows at its ends, then an indication that an organizational chart is not recognized may be returned at step 1924. Otherwise, an unvisited container may be selected as a seed at step 1906. Next, the unvisited neighbors of the container selected as a seed may be recorded as its children at step 1908. It may then be determined at step 1910 whether the container selected as a seed has more than one child. If so, then the regression line for the center of each child may be iteratively determined at step 1912. It may be determined at step 1914 whether any container may have more than one parent. If so, then an indication that an organizational chart is not recognized may be returned at step 1924. If it is determined that each container may not have more than one parent at step 1914 or if it is determined that the container selected as a seed did not have more than one child at step 1910, then it may be determined at step 1916 whether the angle between each rectangle and the corresponding regression line may be less than 20 degrees. If so, then it may be determined at step 1918 whether the maximal angle between all regression lines may be less than 20 degrees. If it is, then an indication that an organizational chart is recognized may be returned at step 1922 and processing may be finished. If it is determined at step 1918 that the maximal angle between all regression lines may not be less than 20 degrees or it is determined at step 1916 that the angle between each rectangle and the corresponding regression line may not be less than 20 degrees, then it may be determined at step 1920 whether the container selected as a seed may be the last unvisited container. If it is not, then processing may continue at step 1906 where another unvisited container may be selected as a seed. If it is determined at step 1920 that the container selected as a seed may be the last unvisited container, then an indication that an organizational chart is not recognized may be returned at step 1924 and processing may be finished.

Figure 20:
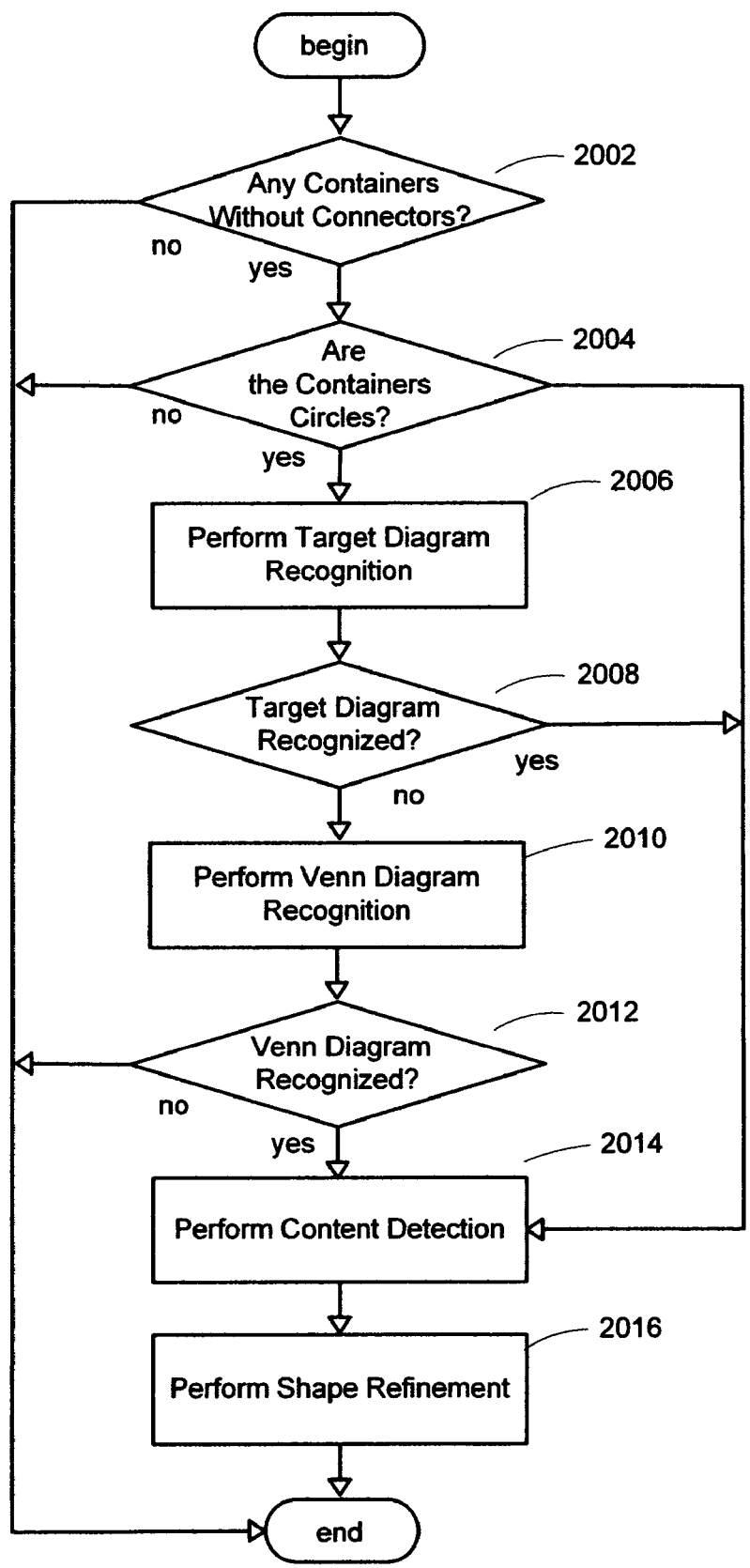
FIG. 20 is a flowchart generally representing an embodiment of the steps undertaken for performing connected container recognition of intersecting containers recognized in the ink input, in accordance with an aspect of the present invention.

FIG. 20 presents a flowchart generally representing an embodiment of the steps undertaken for performing connected container recognition of intersecting containers recognized in the ink input. At step 2002, it may be determined whether there are any containers recognized in the ink input without associated connectors. If not, processing may be finished. Otherwise, it may be determined at step 2004 whether the containers may be circles. If so, target diagram recognition may be performed at step 2006. It may be determined at step 2008 whether a target diagram may be recognized from the unconnected containers. If so, then content detection may be performed at step 2014. Otherwise, Venn diagram recognition may be performed at step 2010. It may be determined at step 2012 whether a Venn diagram may be recognized from the unconnected containers. If so, then content detection may be performed at step 2014. Otherwise, processing may be finished.

In an embodiment, content detection may be performed for each text word by determining the intersection between its bounding box and each connected area. If the largest area ratio between the intersection and the word's bounding box is greater than 0.8, it may be considered to be the content of the corresponding connected area.

The shape of the recognized diagram or chart may be refined at step 2016. For example, all of the circles in a target diagram may be set to the same center and the radiuses of the circles may be set to increase evenly. In the case of a Venn diagram, the radius of each circle in a Venn diagram may be set to the mean radius of all the circles and the centers of each circle may be evenly distributed around the barycenter of the diagram.

Figure 21A:
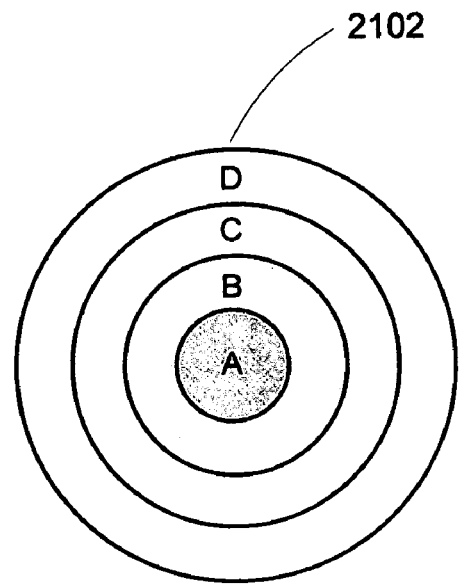
FIGS. 21A-21C are exemplary illustrations generally representing types of diagrams or charts of intersecting containers recognized by connected container recognition for which shape refinement has been performed, in accordance with an aspect of the present invention.
Figure 21B:
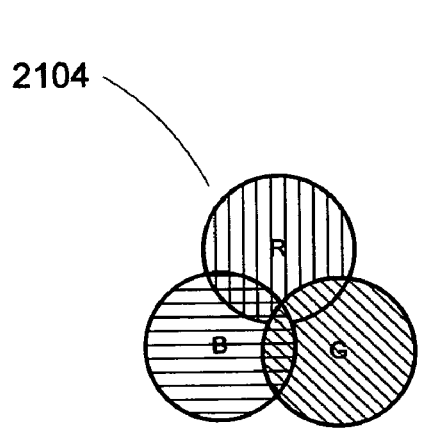
Figure 21C:
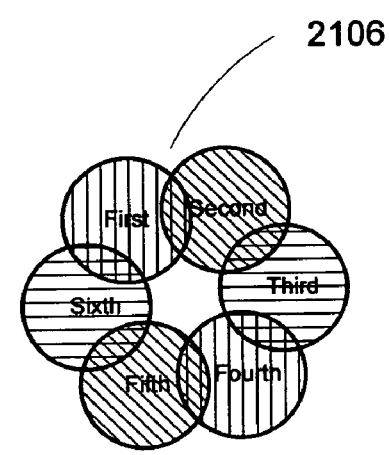

FIGS. 21A-21C provide exemplary illustrations generally representing types of diagrams or charts of intersecting containers recognized by connected container recognition for which shape refinement has been performed. For example, target diagram 2102 in FIG. 21A may illustrate the result of shape refinement after recognition of hand-drawn target diagram 648 in FIG. 6D. Similarly, Venn diagram 2104 in FIG. 21B may illustrate the result of shape refinement after recognition of hand-drawn Venn diagram 658 in FIG. 6E. And Venn diagram 2106 in FIG. 21C may illustrate the result of shape refinement after recognition of hand-drawn Venn diagram 666 in FIG. 6F.

Figure 22:
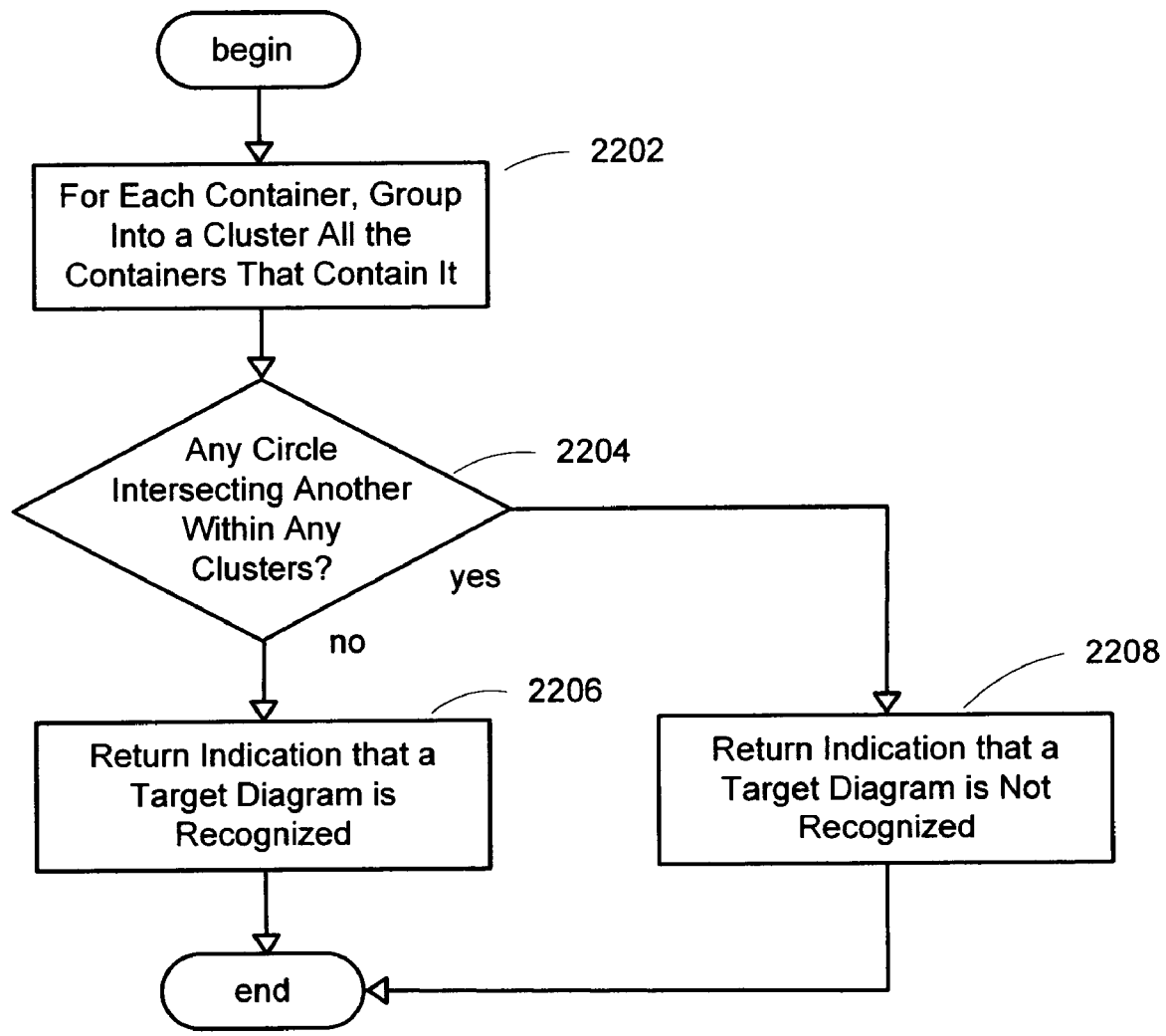
FIG. 22 is a flowchart generally representing one embodiment of the steps undertaken for performing target diagram recognition from the containers recognized in ink input, in accordance with an aspect of the present invention.

FIG. 22 presents a flowchart generally representing one embodiment of the steps undertaken for performing target diagram recognition from the containers recognized in ink input. All the containers that may contain a container may be grouped into a cluster at step 2202 and this step may be performed for each container recognized in ink input. It may next be determined at step 2204 whether there are any circles intersecting another circle within any cluster. If not, then an indication that a target diagram is recognized may be returned at step 2206 and processing may be finished. If there are any circles intersecting another circle within any cluster, then an indication that a target diagram is not recognized may be returned at step 2208 and processing may be finished.

Figure 23:
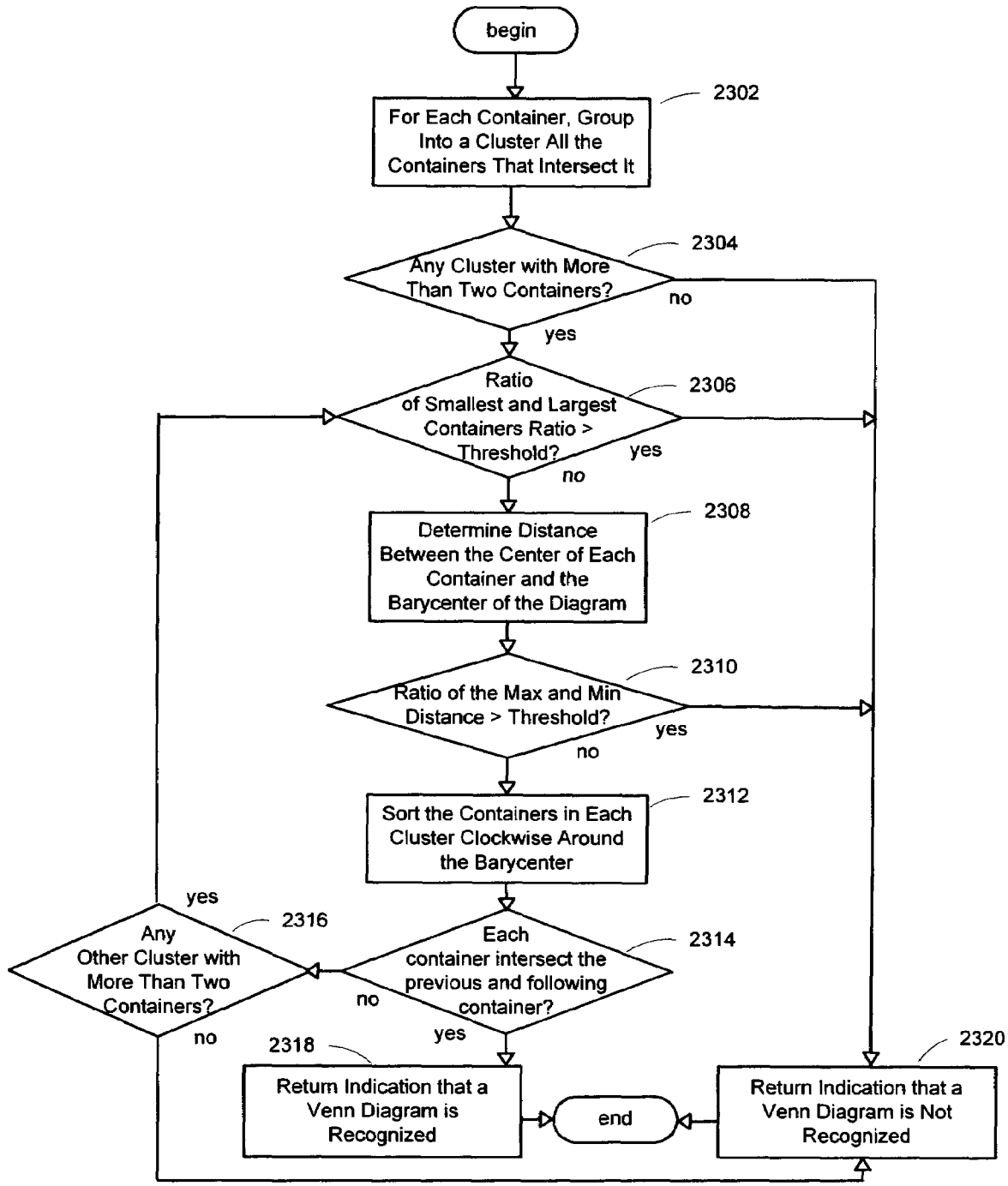
FIG. 23 is a flowchart generally representing one embodiment of the steps undertaken for performing Venn diagram recognition from the containers recognized in ink input, in accordance with an aspect of the present invention.

FIG. 23 presents a flowchart generally representing one embodiment of the steps undertaken for performing Venn diagram recognition from the containers recognized in ink input. All the containers that may intersect a container may be grouped into a cluster at step 2302 and this step may be performed for each container recognized in ink input. It may next be determined at step 2304 whether there are any clusters with more than two containers. If not, then an indication that a Venn diagram is not recognized may be returned at step 2320 and processing may be finished. Otherwise, it may then be determined at step 2306 whether the ratio between the radius of the largest circular container and the radius of the smallest circular container may be greater than a specific threshold. In an embodiment, the threshold may be 2. If the ratio is not greater than the specific threshold, an indication that a Venn diagram is not recognized may be returned at step 2320. If the ratio may be greater than the specific threshold, then the distance between the center of each circular container and the barycenter of the diagram may be determined at step 2308. It may next be determined at step 2310 whether the ratio between the maximum distance and the minimum distance may be greater than a specific threshold. In an embodiment, the threshold may be 1.5. If not, then an indication that a Venn diagram is not recognized may be returned at step 2320. Otherwise, the circular containers in each cluster may be sorted clockwise around the barycenter of the diagram at step 2312. Next, it may be determined at step 2314 whether each circular container in each cluster may intersect the previous and following circular containers. If so, then an indication that a Venn diagram is recognized may be returned at step 2318 and processing may be finished. Otherwise, it may be determined at step 2316 whether there is any other unvisited cluster with more than two containers. If so, then processing may continue at step 2306. If it is determined at step 2316 that there may not be any other unvisited cluster with more than two containers, then an indication that a Venn diagram is not recognized may be returned at step 2320 and processing may be finished.

Figure 24:
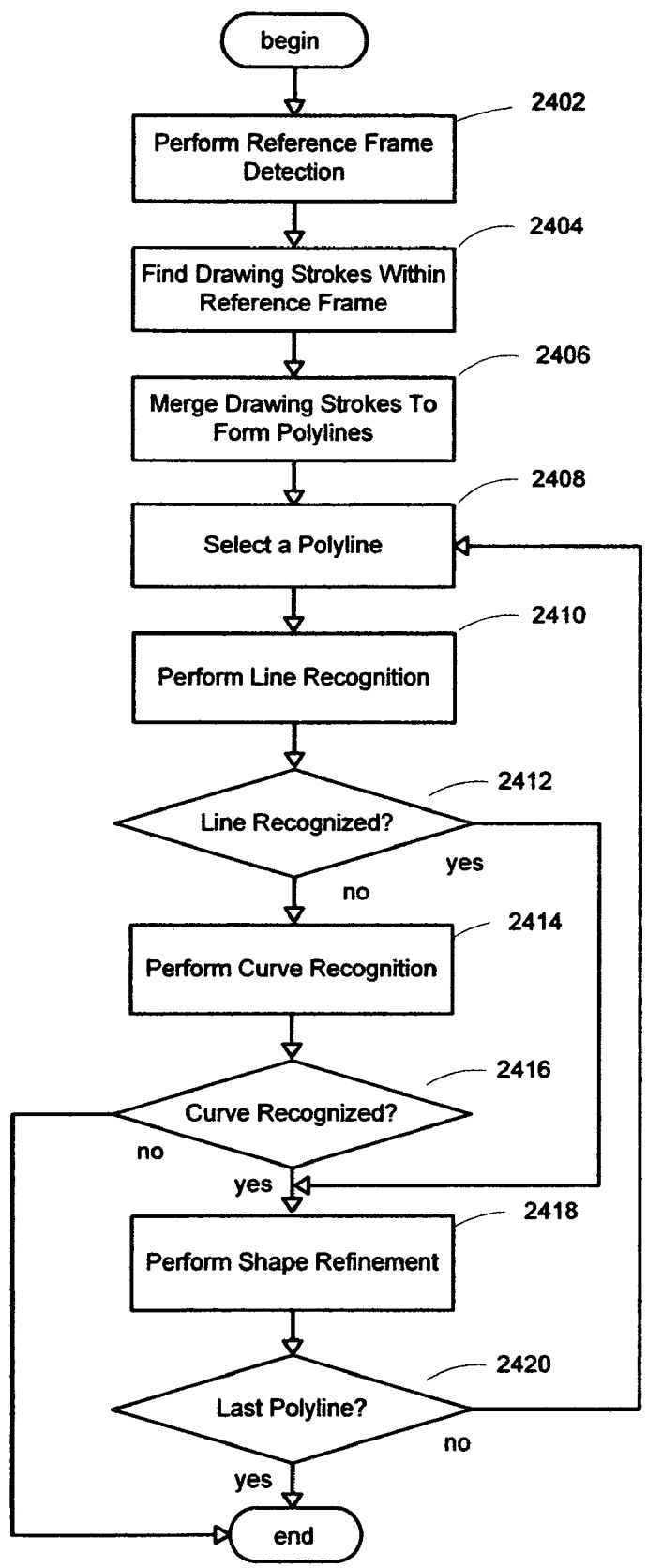
FIG. 24 is a flowchart generally representing one embodiment of the steps undertaken for performing curve recognition of drawing strokes in the ink input, in accordance with an aspect of the present invention.

FIG. 24 presents a flowchart generally representing one embodiment of the steps undertaken for performing curve recognition of drawing strokes in the ink input. At step 2402, reference frame detection may be performed for the drawing strokes in the ink input. When a reference frame may be detected, the X and Y axis of a detected reference frame may form a rectangle in an embodiment. At step 2404, the drawing strokes within a reference frame may then be found. For each drawing stroke, if the ratio between the length of the parts of the drawing stroke that may be inside of the rectangle and the total length of the rectangle is greater than 0.8, then the drawing stroke may be considered in one embodiment to be inside the reference frame detected. Next, the drawing strokes found within the reference frame may be merged at step 2406 to form polylines. In an embodiment, the polylines may be merged using the method for merging skeleton strokes or stroke pieces as described in more detail in U.S. patent application Ser. No. 10/850,718 entitled "System And Method For Shape Recognition of Hand-Drawn Objects," assigned to the same assignee as the present invention.

A polyline may then be selected at step 2408 and line recognition may be performed on the polyline at step 2410. It may then be determined at step 2412 whether a line may be recognized from the polyline. If so, then processing may continue at step 2418 where shape refinement may be performed. If it may be determined that a line may not be recognized from the polyline at step 2412, then curve recognition may be performed at step 2414. Next, it may be determined at step 2416 whether a curve may be recognized from the polyline. If not, then processing may be finished. Otherwise, if a curve may be recognized at step 2416, then shape refinement may be performed at step 2418. It may then be determined whether there is any other polyline not yet selected at step 2420. If there is another polyline not yet selected, then processing may continue at step 2408 where a polyline may be selected. Otherwise, processing may be finished.

Figure 25A:
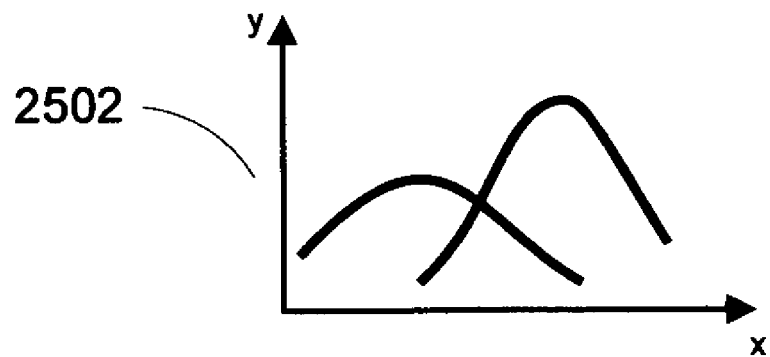
FIGS. 25A and 25B provide exemplary illustrations generally representing types of diagrams or charts recognized by curve recognition for which shape refinement has been performed, in accordance with an aspect of the present invention.
Figure 25B:
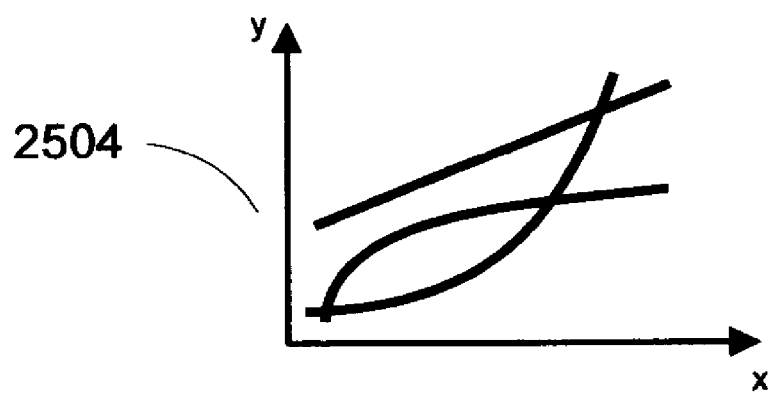

In one embodiment, the shape of the recognized diagram or chart having a line or curve may be refined at step 2418. FIGS. 25A and 25B provide exemplary illustrations generally representing types of diagrams or charts recognized by curve recognition for which shape refinement has been performed. For example, chart 2502 in FIG. 25A may illustrate the result of shape refinement after recognition of hand-drawn chart 702 in FIG. 7A. Similarly, chart 2504 in FIG. 25B may illustrate the result of shape refinement after recognition of hand-drawn chart 708 in FIG. 7B.

Figure 26:
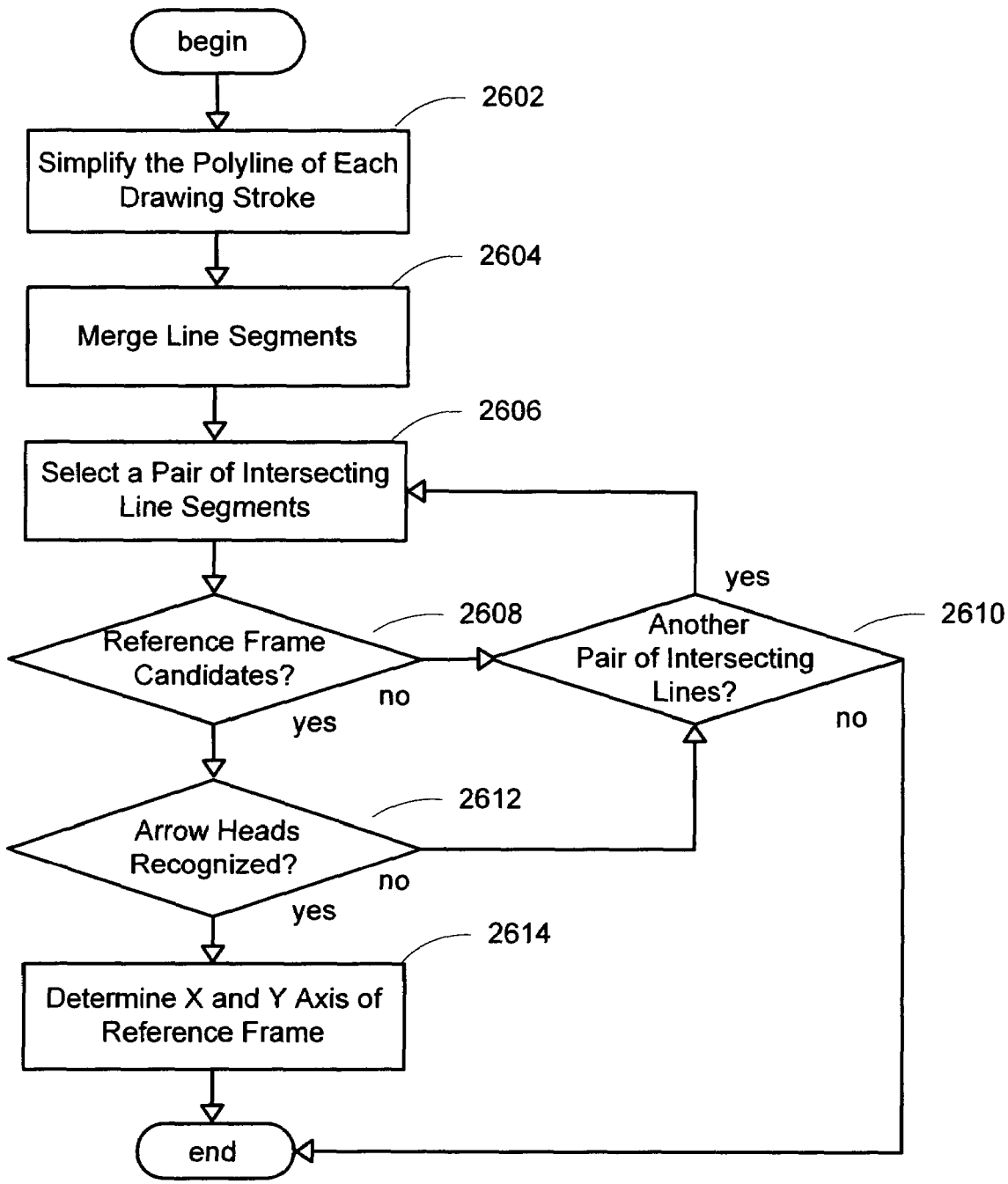
FIG. 26 is a flowchart generally representing one embodiment of the steps undertaken for performing reference frame detection for the drawing strokes in the ink input, in accordance with an aspect of the present invention.

FIG. 26 presents a flowchart generally representing one embodiment of the steps undertaken for performing reference frame detection for the drawing strokes in the ink input. At step 2602, the polyline of each drawing stroke may be simplified. In one embodiment, the polyline may be simplified by applying Sklansky's polyline approximation (which may be found in Sklansky J. and Gonzalez V., Fast Polygonal Approximation of Digitized Curves, Pattern Recognition, Vol. 12, pp. 327-331, 1980). Then line segments may be merged at step 2604. In an embodiment, the following process may be iteratively repeated until no line segments can be merged: the minimal bounding box between two arbitrary line segments of the polylines may be computed, and, if the ratio between maximum(height, width) and minimum (height, width) of the bounding box may be greater than 5, the two line segments may be represented with the diagonal of the box.

After line segments may be merged at step 2604, a pair of intersecting line segments may be selected at step 2606. It may then be determined at step 2608 whether the pair of intersecting line segments may be reference frame candidates. In an embodiment, a pair of intersecting line segments may be considered reference frame candidates if the angle between them may lie between [5 $\pi/12, 7\pi/12$]. If so, then it may be determined at step 2612 whether arrow heads may be recognized for each line at the endpoints farthest from the intersection point of the lines. In an embodiment, all the drawing strokes may be found inside the circles with centers at the endpoints farthest from the intersection point of the lines and with radiuses of 20 millimeters. If an arrow head may be recognized from each set of drawing strokes inside the circles, then the frame reference may be recognized and the X and Y axis of the frame reference may be determined at step 2614 using the right hand rule.

If it is determined at step 2608 that the pair of intersecting line segments may not be reference frame candidates or if it is determined at step 2612 that arrow heads may not be recognized for each line at the endpoints farthest from the intersection point of the lines, then it may be determined at step 2610 whether there may be another pair of intersecting lines not yet selected. If there may be another pair not yet selected, then processing may continue at step 2606 where a pair of intersecting line segments may be selected. Otherwise, processing may be finished.

Figure 27:
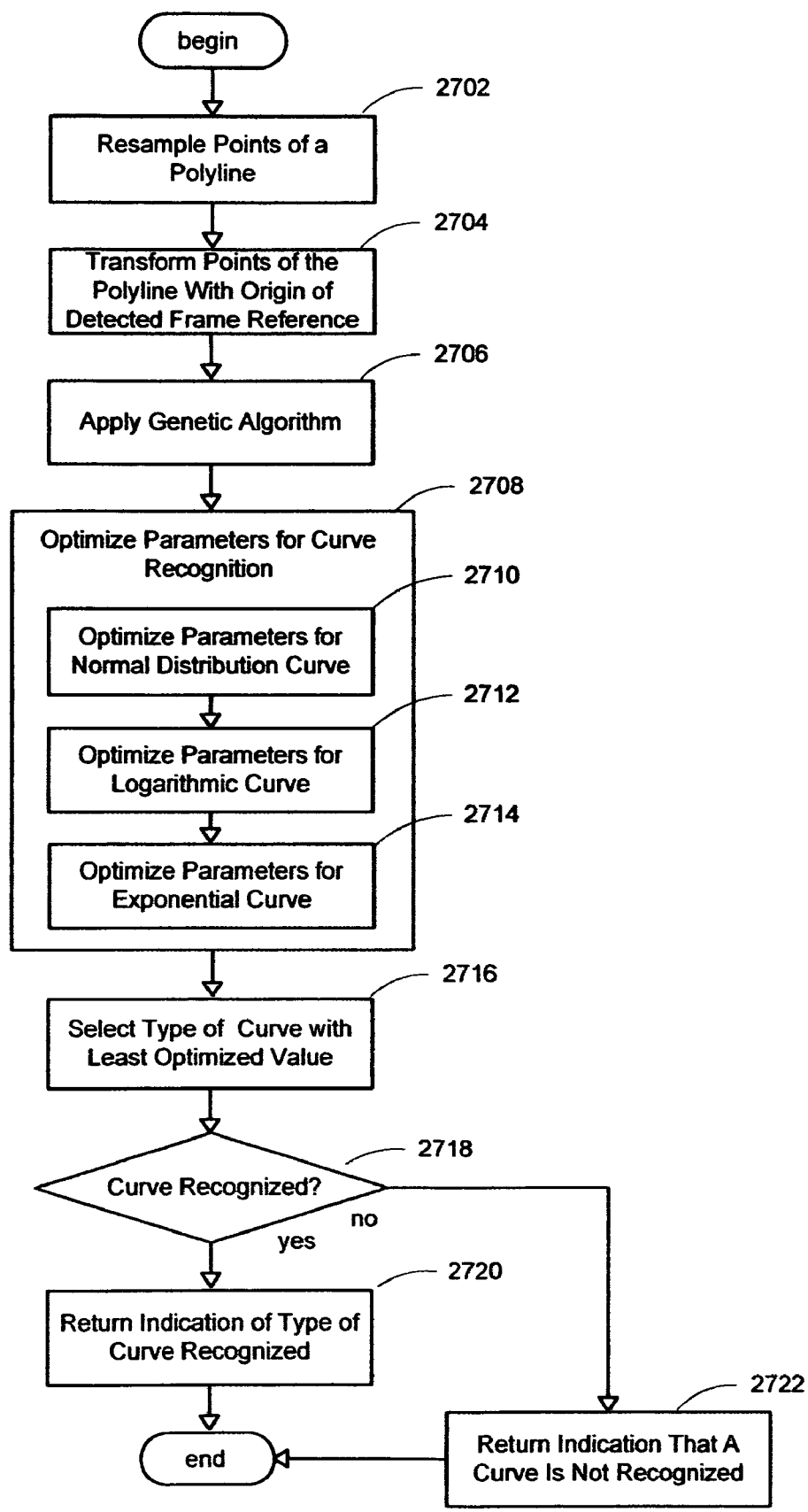
FIG. 27 is a flowchart generally representing one embodiment of the steps undertaken for performing curve recognition of a polyline formed by drawing strokes of ink input, in accordance with an aspect of the present invention.

FIG. 27 presents a flowchart generally representing one embodiment of the steps undertaken for performing curve recognition of a polyline formed by drawing strokes of ink input. At step 2702, the points of the polyline may be resampled. Then the points of the polyline may be transformed at step 2704 with the origin of the frame reference. For example, the polyline may be resampled in an embodiment to 20 points $(x_i', y_i')$ $(1 \leq i \leq 20)$ with even sampling step and then the points may be transformed with $$\begin{cases} x_i = (x_i' - x_0) * \cos\theta + (y_0 - y_i') * \sin\theta \\ y_i = (x_0 - x_i') * \sin\theta + (y_0 - y_i') * \cos\theta \end{cases},$$

where $(x_0, y_0)$ are the coordinates of the detected reference frame's origin in global reference frame, $\theta$ is the angle between the two X-axis of the detected and global reference frame and $(x_i, y_i)$ are the coordinates under detected reference frame.

The genetic algorithm may be applied to the transformed polyline at step 2706. For example, for arbitrary curve y=f(x), the minimal value $$Y = \min\left(\sum_i |f(x_i) - y_i|\right)$$

may be computed in an embodiment with the optimization method of the genetic algorithm. When the minimal value may be calculated, the parameters may also determined at step 2708. The parameters for curve recognition may be optimized for a normal distribution curve at step 2710. For example, a normal distribution may be defined in an embodiment as $$y = \frac{b}{\sigma\sqrt{2\pi}} e^{-(ax-u)^2/(2\sigma^2)},$$

where a,b,u,σ are the parameters to be optimized. The parameters for curve recognition may be optimized for a logarithmic curve at step 2712. For example, a logarithmic curve may be defined in an embodiment as y=cln(ax+b)+d, where a,b,c,d are the parameters to be optimized. The parameters for curve recognition may be optimized for an exponential curve at step 2714. For example, an exponential curve may be defined in an embodiment as $y=ce^{(ax-b)}-d$, where a,b,c,d are the parameters to be optimized. Then the type of curve with the least optimized value may be selected at step 2716. Next it may be determined at step 2718 whether a curve may be recognized. If not, then an indication that a curve is not recognized may be returned at step 2722 and processing may be finished. Otherwise, if a curve may be recognized, then an indication of the type of recognized curve selected may be returned at step 2720 and processing may be finished. In one embodiment, if the least optimized value is less than 60, the polyline may be recognized as the corresponding curve type.

Figure 28:
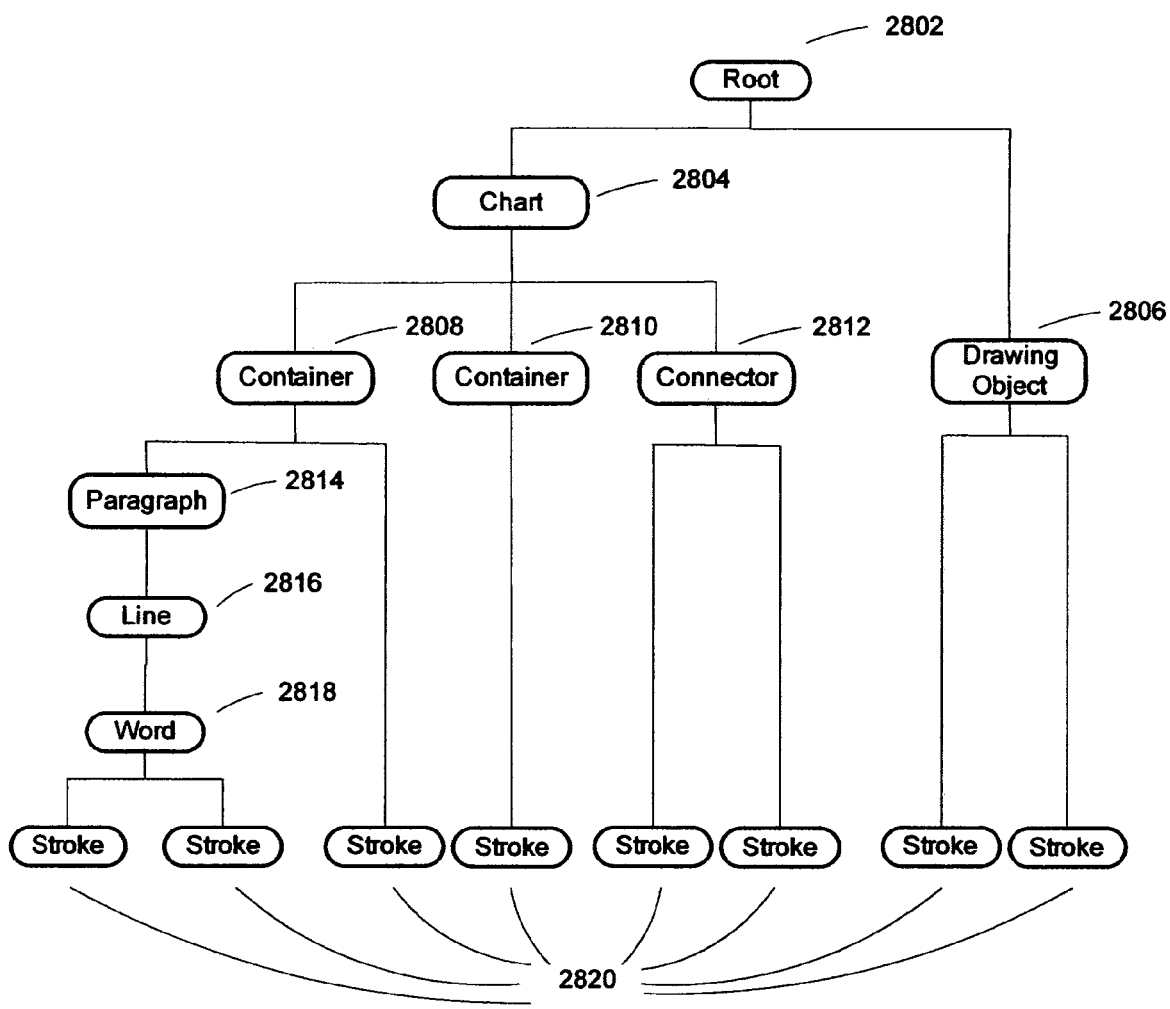
FIG. 28 is an exemplary illustration generally representing a structural relationship of handwritten objects in ink input after performing chart recognition, in accordance with an aspect of the present invention.

Once the hand-drawn diagram or chart has been recognized, the structural relationship of diagram or chart may be understood. FIG. 28 is an exemplary illustration generally representing a structural relationship of handwritten objects in ink input after performing chart recognition. Root 2802 may represent ink input, such as a page of ink input, that may include one or more drawing objects such as drawing objects 2806. A drawing object, such as chart 2804, may be recognized by performing chart recognition of the hand-drawn objects within the ink input. Chart 2804 may be formed by containers 2808 and 2810 which are joined by connector 2812. Container 2808 may include associated content such as text which may be structurally represented by paragraph 2814 that may be made of line 2816 which has a word 2818 formed by strokes 2820.

After the containers and connectors have been recognized by the described system and method, the structure of the hand-drawn objects within the ink input may be completely recognized and generated. By using the present invention, a user may draw diagrams and charts freely and without restrictions on the hand-drawn input. One diagram or chart may have many strokes and the input order of strokes may be arbitrary so that the system and method may accept any ink as input. The structure of the diagram or chart may be recognized, its shape refined, and then drawn.

As can be seen from the foregoing detailed description, the present invention provides a system and method for recognition of a hand-drawn diagram or chart in ink input. Advantageously, the system and method are insensitive to stroke input order and the number of strokes that may form a hand-drawn chart. Additionally, the system and method provided are flexible and extensible. As is now understood, the present invention may be used to detect any diagram or chart in a drawing including a diagram or chart with connected areas such as a pie chart, bar chart, pyramid diagram, and so forth. Moreover, the present invention may be used to detect any diagram or chart with connected containers such as a cycle diagram, a radial diagram, an organizational chart, and so forth. Furthermore, the present invention may be used to detect any hand-drawn diagram or chart with intersecting containers such as a Venn diagram or with a container that may include another container such as a target diagram. Once detected, a drawing may then be generated for each hand-drawn chart recognized within the ink input. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for recognizing a hand-drawn chart in ink input, comprising:
   a curve recognizer for recognizing a hand-drawn chart from drawing strokes in ink input;
   a line recognizer operably coupled to the curve recognizer for recognizing a hand-drawn chart having a line segment;
   a normal distribution recognizer operably coupled to the curve recognizer for recognizing a hand-drawn chart having a normal distribution curve;
   an exponential curve recognizer operably coupled to the curve recognizer for recognizing a hand-drawn chart having an exponential curve; and
   a logarithmic curve recognizer operably coupled to the curve recognizer for recognizing a hand-drawn chart having a logarithmic curve.

2. The system of claim 1 further comprising a chart detector operably coupled to the curve recognizer for receiving ink input, the chart detector comprising a container detector for detecting closed containers within ink input and a connector detector for detecting unclosed connectors within ink input.

3. The system of claim 2 further comprising an ink parser operably coupled to the chart detector for sending ink input to the chart detector.

4. The system of claim 3 further comprising a shape recognizer operably coupled to the ink parser for recognizing a hand-drawn shape.

5. The system of claim 4 wherein the shape recognizer comprises a container recognizer operably coupled to the shape recognizer.

6. The system of claim 4 wherein the shape recognizer comprises a connector recognizer operably coupled to the shape recognizer.

7. A method in a computer system for recognizing a hand-drawn chart in ink input, wherein the method is implemented by a system comprising:
   a curve recognizer for recognizing a hand-drawn chart from drawing strokes in ink input;
   a line recognizer operably coupled to the curve recognizer for recognizing a hand-drawn chart having a line segment;
   a normal distribution recognizer operably coupled to the curve recognizer for recognizing a hand-drawn chart having a normal distribution curve;
   an exponential curve recognizer operably coupled to the curve recognizer for recognizing a hand-drawn chart having an exponential curve; and
   a logarithmic curve recognizer operably coupled to the curve recognizer for recognizing a hand-drawn chart having a logarithmic curve; and
   wherein the method comprises:
   receiving ink input;
   performing chart detection for drawing strokes in the ink input;
   performing shape recognition for drawing objects detected within the ink input; and
   performing curve recognition for the drawing strokes within the ink input for recognition of a hand-drawn chart having a curve.

8. The method of claim 7 further comprising generating a drawing for each hand-drawn chart recognized within the ink input.

9. The method of claim 7 further comprising performing shape refinement of the curve recognized in the hand-drawn chart.

10. The method of claim 7 wherein performing curve recognition for the drawing strokes within the ink input for recognition of a hand-drawn chart having a curve comprises performing reference frame detection for the drawing strokes in the ink input.

11. The method of claim 10 further comprising transforming points of a polyline formed by at least one of the drawing strokes in the ink input using the origin of a detected reference frame.

12. The method of claim 7 wherein performing curve recognition for the drawing strokes within the ink input for recognition of a hand-drawn chart having a curve comprises performing line recognition of a polyline formed by at least one of the drawing strokes in the ink input.

13. The method of claim 7 wherein performing curve recognition for the drawing strokes within the ink input for recognition of a hand-drawn chart having a curve comprises performing curve recognition of a polyline formed by at least one of the drawing strokes in the ink input.

14. The method of claim 13 wherein performing curve recognition of the polyline comprises applying a genetic algorithm to the polyline.

15. The method of claim 14 wherein applying the genetic algorithm to the polyline comprises optimizing parameters for a normal distribution curve.

16. The method of claim 14 wherein applying the genetic algorithm to the polyline comprises optimizing parameters for a logarithmic curve.

17. The method of claim 14 wherein applying the genetic algorithm to the polyline comprises optimizing parameters for an exponential curve.

18. A computer-readable memory having computer-executable instructions for performing the method of claim 7.

19. A computer system for detecting a hand-drawn shape, comprising:
- means for receiving ink input;
- means for performing chart detection for the drawing strokes in the ink input;
- means for performing shape recognition for drawing objects detected within the ink input, said means for performing shape recognition including:
  - a line recognizer operably coupled to the curve recognizer for recognizing a hand-drawn chart having a line segment;
  - a normal distribution recognizer operably coupled to the curve recognizer for recognizing a hand-drawn chart having a normal distribution curve;
  - an exponential curve recognizer operably coupled to the curve recognizer for recognizing a hand-drawn chart having an exponential curve; and
  - a logarithmic curve recognizer operably coupled to the curve recognizer for recognizing a hand-drawn chart having a logarithmic curve; and
- means for performing curve recognition for the drawing strokes within the ink input for recognition of a hand-drawn chart having a curve.

* * * * *